(12) United States Patent
German et al.

(10) Patent No.: US 7,125,933 B2
(45) Date of Patent: *Oct. 24, 2006

(54) VERY LOW DENSITY POLYETHYLENE BLENDS

(75) Inventors: Paul Masten German, Friendswood, TX (US); James McLeod Farley, League City, TX (US); Richard W. Halle, Houston, TX (US); George Panagopoulos, Atlanta, GA (US)

(73) Assignee: Univation Technologies, LLC, Houston, TX (US)

( * ) Notice: Subject to any disclaimer, the term of this patent is extended or adjusted under 35 U.S.C. 154(b) by 245 days.

This patent is subject to a terminal disclaimer.

(21) Appl. No.: 10/297,777

(22) PCT Filed: Jun. 22, 2001

(86) PCT No.: PCT/US01/20077

§ 371 (c)(1),
(2), (4) Date: Oct. 28, 2003

(87) PCT Pub. No.: WO01/98406

PCT Pub. Date: Dec. 27, 2001

(65) Prior Publication Data

US 2004/0072005 A1    Apr. 15, 2004

Related U.S. Application Data

(60) Provisional application No. 60/278,560, filed on Mar. 23, 2001, provisional application No. 60/278,567, filed on Mar. 23, 2001, provisional application No. 60/278,315, filed on Mar. 23, 2001, provisional application No. 60/270,802, filed on Feb. 23, 2001, provisional application No. 60/243,208, filed on Oct. 25, 2000, provisional application No. 60/213,571, filed on Jun. 22, 2000.

(51) Int. Cl.
C08L 23/00    (2006.01)
C08L 23/04    (2006.01)

(52) U.S. Cl. .................... 525/191; 525/240
(58) Field of Classification Search ............. 525/191, 525/240
See application file for complete search history.

(56) References Cited

U.S. PATENT DOCUMENTS

| | | | |
|---|---|---|---|
| 5,272,236 A | 12/1993 | Lai et al. | 526/348.5 |
| 5,278,272 A | 1/1994 | Lai et al. | 526/348.5 |
| 5,382,631 A | 1/1995 | Stehling et al. | 525/240 |
| 5,707,751 A | 1/1998 | Garza et al. | 428/515 |
| 5,907,943 A | 6/1999 | Eichbauer | 53/441 |
| 5,922,441 A | 7/1999 | Eichbauer | 428/213 |
| 5,972,444 A | 10/1999 | Patel et al. | 428/35.2 |
| 6,800,692 B1 * | 10/2004 | Farley et al. | 525/191 |
| 2004/0014895 A1 * | 1/2004 | Farley et al. | 525/240 |

FOREIGN PATENT DOCUMENTS

| | | |
|---|---|---|
| WO | WO 96/08521 | 3/1996 |
| WO | WO 98/21274 | 5/1998 |
| WO | WO 98/21276 | 5/1998 |

* cited by examiner

Primary Examiner—Nathan M. Nutter
(74) Attorney, Agent, or Firm—Leandro Arechederra

(57) ABSTRACT

Blends of very low density polyethylene produced using metallocene catalysts (mVLDPE) and linear low density polyethylene (LLDPE) are disclosed. The polymer blends include a metallocene-catalyzed VLDPE polymer having a density of less than 0.916 g/cm3, the VLDPE polymer preferably being linear and without long chain branching, and a LLDPE polymer having a density of from 0.916 to 0.940 g/cm3. The polymer blends are particularly suitable in blown and cast film applications.

25 Claims, No Drawings

VERY LOW DENSITY POLYETHYLENE BLENDS

This application claims the benefit of U.S. Provisional Application No. 60/213,571, filed Jun. 22, 2000; U.S. Provisional Application No. 60/243,208, filed Oct. 25, 2000; U.S. Provisional Application No. 60/270,802, filed Feb. 23, 2001; U.S. Provisional Application No. 60/278,560, filed Mar. 23, 2001; U.S. Provisional Application No. 60/278,315, filed Mar. 23, 2001; and U.S. Provisional Application No. 60/278,567 filed Mar. 23, 2001, the entire disclosures of which are hereby incorporated by reference.

1. FIELD OF THE INVENTION

The present invention relates generally to polyolefin blends and films produced from polyolefin blends. More specifically, the present invention is directed to blends of very low density polyethylene produced using metallocene catalysts and linear low density polyethylene, and films formed of such blends.

2. BACKGROUND

Various types of polyethylenes are known in the art. Low density polyethylene ("LDPE") can be prepared at high pressure using free radical initiators, or in gas phase processes using Ziegler-Natta or vanadium catalysts, and typically has a density in the range of 0.916–0.940 g/cm$^3$. LDPE is also known as "branched" or "heterogeneously branched" polyethylene because of the relatively large number of long chain branches extending from the main polymer backbone. Polyethylene in the same density range, i.e., 0.916 to 0.940 g/cm$^3$, which is linear and does not contain long chain branching is also known; this "linear low density polyethylene" ("LLDPE") can be produced with conventional Ziegler-Natta catalysts or with metallocene catalysts. Relatively higher density LDPE, typically in the range of 0.928 to 0.940 g/cm$^3$, is sometimes referred to as medium density polyethylene ("MDPE"). Polyethylenes having still greater density are the high density polyethylenes ("HDPEs"), i.e., polyethylenes having densities greater than 0.940 g/cm$^3$, and are generally prepared with Ziegler-Natta catalysts. Very low density polyethylene ("VLDPE") is also known. VLDPEs can be produced by a number of different processes yielding polymers with different properties, but can be generally described as polyethylenes having a density less than 0.916 g/cm$^3$, typically 0.890 to 0.915 g/cm$^3$ or 0.900 to 0.915 g/cm$^3$.

U.S. Pat. Nos. 5,272,236 and 5,278,272 disclose polyethylenes termed "substantially linear ethylene polymers" ("SLEPs"). These SLEPs are characterized as having a polymer backbone substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons. As used in U.S. Pat. Nos. 5,272,236 and 5,278,272, "long chain branching" is defined as a chain length of at least about 6 carbons, above which the length cannot be distinguished using $^{13}$C NMR spectroscopy. It is further disclosed that the long chain branch can be as long as about the same length as the length of the polymer backbone.

As used in the present disclosure, the term "linear" is applied to a polymer that has a linear backbone and does not have long chain branching; i.e., a "linear" polymer is one that does not have the long chain branches characteristic of a SLEP polymer.

Blends of polyethylenes are also known. Blending has been used to form polymer compositions having altered properties, such as melt index and various processability characteristics. Blending has also been used to form polymer compositions having properties enhanced for particular end uses. For example, polymer blends have been used to form cast or extruded films with altered film properties, such as toughness, tear resistance, shrink properties, and other desired film characteristics.

U.S. Pat. No. 5,972,444 discloses a polyolefin shrink film made from a polymer mixture which includes a first ethylene polymer component having a single differential scanning calorimetry (DSC) melting peak or a single Analytical Temperature Rising Elution Fractionation (ATREF) peak and a second ethylene polymer component having one or more DSC melting peaks, wherein the density differential between the two component polymers about 0 to about 0.03 g/cm$^3$. Preferably, the first ethylene polymer component is a substantially linear ethylene polymer (SLEP) and the second component polymer is a heterogeneously branched linear ethylene polymer. Commonly assigned PCT publication WO 98/21276 discloses similar films.

U.S. Pat. No. 5,707,751 discloses shrink film compositions comprising precise combinations of "narrow, substantially singular" melting point polyethylene with a higher melting point (by at least about 10° C.) polyethylene.

U.S. Pat. No. 5,382,631 discloses polymer blends and single or multilayer films made from the blends. The blends are made from components having a narrow molecular weight distribution (e.g., Mw/Mn 3) and a narrow composition distribution (e.g., CDBI>50%). The blend components of the blend can all have the same molecular weight but different comonomer contents, the same comonomer content but different molecular weights, or comonomer contents which increase with molecular weight. The blends have either Mw/Mn>3 and/or CDBI<50%, and combinations of each, and can be bimodal with respect to either or both molecular weight and/or comonomer content. The blends are generally free of blend components having both a higher average molecular weight and a lower average comonomer content than another blend component.

U.S. Pat. Nos. 5,907,943 and 5,922,441 disclose a thermoplastic stretch wrap film containing at least three layers, the inner layer of which comprises a blend of a "low dispersity polymer" and either a high pressure low density polyethylene resin, a very low density polyethylene resin or a combination thereof. The low dispersity polymer has a density of from about 0.88 to 0.94 g/cm$^3$.

3. SUMMARY

In one embodiment, the present invention is directed to a polymer blend, the blend including a very low density polyethylene (VLDPE) polymer having a density of less than 0.916 g/cm$^3$, and a linear low density polyethylene (LLDPE) polymer, having a density of from 0.916 to 0.940 g/cm$^3$. Preferably the VLDPE and LLDPE polymers are metallocene-catalyzed polymers.

In another embodiment, the present invention is directed to a polymer blend, the blend including a metallocene-produced VLDPE polymer, preferably a gas-phase metallocene-produced VLDPE polymer, the VLDPE polymer being a copolymer of ethylene and at least one $C_3$ to $C_{12}$ alpha olefin and having a density of from 0.900 to 0.915 g/cm³ and a melt index of from 0.5 to 20 g/10 min; and a metallocene-produced LLDPE polymer, the LLDPE polymer being a copolymer of ethylene and at least one $C_3$ to $C_{12}$ alpha olefin and having a density of from 0.916 to 0.940 g/cm³ and a melt index of from 0.5 to 20 g/10 min. The blend can include, for example, 5–85% by weight of the VLDPE polymer and 95–15% by weight of the LLDPE polymer, based on the total weight of the VLDPE and LLDPE polymers.

In another embodiment, the present invention is directed to a polymer blend, the blend including a gas-phase metallocene-produced VLDPE polymer, the VLDPE polymer being a copolymer of ethylene and 1-butene, 1-hexene, 4-methyl-1-pentene, or 1-octene and having a density of from 0.910 to 0.915 g/cm³, a melt index of from 0.5 to 20 g/10 min, a composition distribution breadth index of 60 to 80 wt %, and a molecular weight distribution (Mw/Mn) of 2.2 to 2.8; and a metallocene-produced LLDPE polymer, the LLDPE polymer being a copolymer of ethylene and 1-butene, 1-hexene, 4-methyl-1-pentene or 1-octene and having a density of from 0.916 to 0.925 g/cm³ and a melt index of from 0.5 to 20 g/10 min. In this embodiment, the blend preferably includes 10–50% by weight of the VLDPE polymer and 90–50% by weight of the LLDPE polymer, based on the total weight of the VLDPE and LLDPE polymers.

In one embodiment, the present invention is directed to a VLDPE/LLDPE polymer blend, the blend including a metallocene-produced VLDPE polymer comprising an ethylene copolymer with a comonomer content of 25% or less by weight, preferably 20% or less by weight, and more preferably 15% or less by weight.

In another embodiment, the present invention is directed to monolayer films formed from the polymer blends of the invention.

In another embodiment, the present invention is directed to multilayer films, wherein at least one layer of the multilayer film is formed of a polymer blend of the invention.

In other embodiments, the invention is directed to articles including the films of the invention, articles wrapped with the films of the invention, and substrates coated with the films of the invention.

4. DETAILED DESCRIPTION

4.1 The VLDPE Component

The polymer blends and films of the present invention include a very low density polyethylene (VLDPE) polymer. As used herein, the terms "very low density polyethylene" polymer and "VLDPE" polymer refer to a polyethylene copolymer having a density of less than 0.916 g/cm³. Polymers having more than two types of monomers, such as terpolymers, are also included within the term "copolymer" as used herein. The comonomers that are useful in general for making VLDPE copolymers include α-olefins, such as $C_3$–$C_{20}$ α-olefins and preferably $C_3$–$C_{12}$ α-olefins. The α-olefin comonomer can be linear or branched, and two or more comonomers can be used, if desired. Examples of suitable comonomers include linear $C_3$–$C_{12}$ α-olefins, and α-olefins having one or more $C_1$–$C_3$ alkyl branches, or an aryl group. Specific examples include propylene; 1-butene, 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene, more preferably 1-butene, 1-hexene, and 1-octene.

Although not generally preferred, other useful comonomers include polar vinyl, conjugated and non-conjugated dienes, acetylene and aldehyde monomers, which can be included in minor amounts in terpolymer compositions. Non-conjugated dienes useful as co-monomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB). Note that throughout this description the terms "non-conjugated diene" and "diene" are used interchangeably.

It should be appreciated that the amount of comonomer used will depend upon the desired density of the VLDPE polymer and the specific comonomers selected. For one embodiment of the VLDPE polymer comprising an ethylene/butene copolymer, the molar ratio of butene to ethylene should be from about 0.015 to 0.035, preferably from 0.020 to 0.030. For one embodiment of the VLDPE polymer comprising an ethylene/hexene copolymer, the molar ratio of hexene to ethylene should be from about 0.015 to 0.035, preferably from 0.020 to 0.030. For one embodiment of the VLDPE polymer comprising an ethylene/octene copolymer, the molar ratio of octene to ethylene should be from about 0.015 to 0.035, preferably from 0.020 to 0.030. In general, the comonomer may be present in an amount of 25% or less by weight, preferably 20% or less by weight and more preferably 15% or less by weight. In one embodiment, the comonomer may be present in an amount of 5% or more by weight. It is well-understood in the art that, for a given comonomer, the density of the VLDPE polymer produced therefrom decreases as the comonomer content increases. One skilled in the art can readily determine the appropriate comonomer content appropriate to produce a VLDPE polymer having a desired density.

The VLDPE polymer has a density of less than 0.916 g/cm³, and preferably at least 0.890 g/cm³, more preferably at least 0.900 g/cm³. Thus, a preferred density range for the VLDPE polymer is 0.900 g/cm³ to 0.915 g/cm³. Alternate lower limits of the VLDPE polymer density include 0.905 g/cm³ or 0.910 g/cm³.

The VLDPE polymer is further characterized by a melt index (MI) of from 0.5 to 20 g/10 min (dg/min), as measured in accordance with ASTM-1238 condition E. In one or more specific embodiments, alternative lower limits for the melt index include 0.7 and 1.0 g/10 min, and alternative upper limits for the melt index include 5, 10, 12 and 15 g/10 min, with melt index ranges from any lower limit to any upper limit being within the scope of the invention.

In one embodiment, the VLDPE polymer is made in a metallocene-catalyzed polymerization process. As used herein, the terms "metallocene-catalyzed VLDPE," "metallocene-produced VLDPE," or "m-VLDPE" refer to a VLDPE polymer having the density and melt index properties described herein, and being produced in the presence of a metallocene catalyst. One skilled in the art will recognize that a metallocene-catalyzed VLDPE polymer has measurable properties distinguishable from a VLDPE polymer having the same comonomers in the same weight percentages but produced from a different process, such as a conventional Ziegler-Natta polymerization process.

The terms "metallocene" and "metallocene catalyst precursor" as used herein mean compounds having a Group 4, 5 or 6 transition metal (M), with a cyclopentadienyl (Cp) ligand or ligands which may be substituted, at least one non-cyclopentadienyl-derived ligand (X), and zero or one heteroatom-containing ligand (Y), the ligands being coordinated to M and corresponding in number to the valence thereof. The metallocene catalyst precursors generally require activation with a suitable co-catalyst (referred to as an "activator"), in order to yield an "active metallocene catalyst", i.e., an organometallic complex with a vacant coordination site that can coordinate, insert, and polymerize olefins. The metallocene catalyst precursor is preferably one of, or a mixture of metallocene compounds of either or both of the following types:

(1) Cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike, unsubstituted, substituted, or a derivative thereof, such as a heterocyclic ring system which may be substituted, and the substitutions can be fused to form other saturated or unsaturated rings systems such as tetrahydroindenyl, indenyl, or fluorenyl ring systems. These cyclopentadienyl complexes have the general formula $$(Cp^1R^1{}_m)R^3{}_n(Cp^2R^2{}_p)MX_q$$

wherein: $Cp^1$ and $Cp^2$ are the same or different cyclopentadienyl rings; $R^1$ and $R^2$ are each, independently, a halogen or a hydrocarbyl, halocarbyl, hydrocarbyl-substituted organometalloid or halocarbyl-substituted organometalloid group containing up to about 20 carbon atoms; m is 0 to 5; p is 0 to 5; two $R^1$ and/or $R^2$ substituents on adjacent carbon atoms of the cyclopentadienyl ring associated therewith can be joined together to form a ring containing from 4 to about 20 carbon atoms; $R^3$ is a bridging group; n is the number of atoms in the direct chain between the two ligands and is 0 to 8, preferably 0 to 3; M is a transition metal having a valence of from 3 to 6, preferably from group 4, 5, or 6 of the periodic table of the elements and is preferably in its highest oxidation state; each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; and q is equal to the valence of M minus 2.

(2) Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from Group 15 or a coordination number of two from group 16 of the periodic table of the elements. These mono-cyclopentadienyl complexes have the general formula $$(Cp^1R^1{}_m)R^3{}_n(Y_rR^2)MX_s$$

wherein: each $R^1$ is independently, a halogen or a hydrocarbyl, halocarbyl, hydrocarbyl-substituted organometalloid or halocarbyl-substituted organometalloid group containing up to about 20 carbon atoms, "m" is 0 to 5, and two $R^1$ substituents on adjacent carbon atoms of the cyclopentadienyl ring associated there with can be joined together to form a ring containing from 4 to about 20 carbon atoms; $R^3$ is a bridging group; "n" is 0 to 3; M is a transition metal having a valence of from 3 to 6, preferably from group 4, 5, or 6 of the periodic table of the elements and is preferably in its highest oxidation state; Y is a heteroatom containing group in which the heteroatom is an element with a coordination number of three from Group 15 or a coordination number of two from group 16, preferably nitrogen, phosphorous, oxygen, or sulfur; $R^2$ is a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two $R^2$ groups on Y each independently a radical selected from the group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, "s" is equal to the valence of M minus 2.

Examples of biscyclopentadienyl metallocenes of the type described in group (1) above for producing the m-VLDPE polymers of the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614.

Illustrative, but not limiting, examples of suitable biscyclopentadienyl metallocenes of the type described in group (1) above are the racemic isomers of:

μ-$(CH_3)_2$Si(indenyl)$_2$M(Cl)$_2$;
μ-$(CH_3)_2$Si(indenyl)$_2$M$(CH_3)_2$;
μ-$(CH_3)_2$Si(tetrahydroindenyl)$_2$M(Cl)$_2$;
μ-$(CH_3)_2$Si(tetrahydroindenyl)$_2$M$(CH_3)_2$;
μ-$(CH_3)_2$Si(indenyl)$_2$M$(CH_2CH_3)_2$; and
μ-$(C_6H_5)_2$C(indenyl)$_2$M$(CH_3)_2$;

wherein M is Zr or Hf.

Examples of suitable unsymmetrical cyclopentadienyl metallocenes of the type described in group (1) above are disclosed in U.S. Pat. Nos. 4,892,851; 5,334,677; 5,416,228; and 5,449,651; and in the publication *J. Am. Chem. Soc.* 1988, 110, 6255.

Illustrative, but not limiting, examples of preferred unsymmetrical cyclopentadienyl metallocenes of the type described in group (1) above are:

μ-$(C_6H_5)_2$C(cyclopentadienyl)(fluorenyl)M$(R)_2$;
μ-$(C_6H_5)_2$C(3-methylcyclopentadienyl)(fluorenyl)M$(R)_2$;
μ-$(CH_3)_2$C(cyclopentadienyl)(fluorenyl)M$(R)_2$;
μ-$(C_6H_5)_2$C(cyclopentadienyl)(2-methylindenyl)M$(CH_3)_2$;
μ-$(C_6H_5)_2$C(3-methylcyclopentadienyl)(2-methylindenyl)M$(Cl)_2$;
μ-$(C_6H_5)_2$C(cyclopentadienyl)(2,7-dimethylfluorenyl)M$(R)_2$; and
μ-$(CH_3)_2$C(cyclopentadienyl)(2,7-dimethylfluorenyl)M$(R)_2$;

wherein M is Zr or Hf, and R is Cl or $CH_3$.

Examples of suitable monocyclopentadienyl metallocenes of the type described in group (2) above are disclosed in U.S. Pat. Nos. 5,026,798; 5,057,475; 5,350,723; 5,264,405; 5,055,438; and in WO 96/002244.

Illustrative, but not limiting, examples of preferred monocyclopentadienyl metallocenes of the type described in group (2) above are:

μ-$(CH_3)_2$Si(cyclopentadienyl)(1-adamantylamido)M$(R)_2$;
μ-$(CH_3)_2$Si(3-tertbutylcyclopentadienyl)(1-adamantylamido)M$(R)_2$;
μ-$(CH_2$(tetramethylcyclopentadienyl)(1-adamantylamido)M$(R)_2$;
μ-$(CH_3)_2$Si(tetramethylcyclopentadienyl)(1-adamantylamido)M$(R)_2$;
μ-$(CH_3)_2$C(tetramethylcyclopentadienyl)(1-adamantylamido)M$(R)_2$;
μ-$(CH_3)_2$Si(tetramethylcyclopentadienyl)(1-tertbutylamido)M$(R)_2$;
μ-$(CH_3)_2$Si(fluorenyl)(1-tertbutylamido)M$(R)_2$;
μ-$(CH_3)_2$Si(tetramethylcyclopentadienyl)(1-cyclododecylamido)M$(R)_2$; and
μ-$(C_6H_5)_2$C(tetramethylcyclopentadienyl)(1-cyclododecylamido)M$(R)_2$;

wherein M is Ti, Zr or Hf, and R is Cl or $CH_3$.

Other organometallic complexes that are useful catalysts for the VLDPE polymers described herein are those with diimido ligand systems, such as are described in WO 96/23010. Other references describing suitable organometallic complexes include Organometallics, 1999, 2046; PCT publications WO 99/14250, WO 98/50392, WO 98/41529, WO 98/40420, WO 98/40374, WO 98/47933; and European publications EP 0 881 233 and EP 0 890 581.

The metallocene compounds and/or other organometallic complexes are contacted with an activator to produce an active catalyst. One class of activators is noncoordinating anions, where the term "noncoordinating anion" (NCA) means an anion which either does not coordinate to the transition metal cation or which is only weakly coordinated to the transition metal cation, thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically the anion will have a molecular size of. greater than or equal to about 4 angstroms.

An additional method of making metallocene catalysts uses ionizing anionic pre-cursors which are initially neutral Lewis acids but form the cation and anion upon ionizing reaction with the metallocene compounds. For example, tris(pentafluorophenyl) boron acts to abstract an alkyl, hydride or silyl ligand from the metallocene compound to yield a metallocene cation and a stabilizing non-coordinating anion; see, EP-A-0 427 697 and EP-A-0 520 732. Metallocene catalysts for addition polymerization can also be prepared by oxidation of the metal centers of transition metal compounds by anionic precursors containing metallic oxidizing groups along with the anion groups; see EP-A-0 495 375.

Examples of suitable activators capable of ionic cationization of the metallocene compounds of the invention, and consequent stabilization with a resulting noncoordinating anion, include:

trialkyl-substituted ammonium salts such as:
triethylammonium tetraphenylborate;
tripropylammonium tetraphenylborate;
tri(n-butyl)ammonium tetraphenylborate;
trimethylammonium tetrakis(p-tolyl)borate;
trimethylammonium tetrakis(o-tolyl)borate;
tributylammonium tetrakis(pentafluorophenyl)borate;
tripropylammonium tetrakis(o,p-dimethylphenyl)borate;
tributylammonium tetrakis(m,m-dimethylphenyl)borate;
tributylammonium tetrakis(p-trifluoromethylphenyl)borate;
tributylammonium tetrakis(pentafluorophenyl)borate; and
tri(n-butyl)ammonium tetrakis(o-tolyl)borate;

N,N-dialkyl anilinium salts such as:
N,N-dimethylanilinium tetrakis(pentafluorophenyl)borate;
N,N-dimethylaniliniumtetrakis(heptafluoronaphthyl)borate;
N,N-dimethylanilinium tetrakis(perfluoro-4-biphenyl)borate;
N,N-dimethylanilinium tetraphenylborate;
N,N-diethylanilinium tetraphenylborate; and
N,N-2,4,6-pentamethylanilinium tetraphenylborate;

dialkyl ammonium salts such as:
di-(isopropyl)ammonium tetrakis(pentafluorophenyl)borate; and
dicyclohexylammonium tetraphenylborate; and triaryl phosphonium salts such as:
triphenylphosphonium tetraphenylborate;
tri(methylphenyl)phosphonium tetraphenylborate; and
tri(dimethylphenyl)phosphonium tetraphenylborate.

Further examples of suitable anionic precursors include those including a stable carbonium ion, and a compatible non-coordinating anion. These include:
tropillium tetrakis(pentafluorophenyl)borate;
triphenylmethylium tetrakis(pentafluorophenyl)borate;
benzene (diazonium) tetrakis(pentafluorophenyl)borate;
tropillium phenyltris(pentafluorophenyl)borate;
triphenylmethylium phenyl-(trispentafluorophenyl)borate;
benzene (diazonium) phenyl-tris(pentafluorophenyl)borate;

tropillium tetrakis(2,3,5,6-tetrafluorophenyl)borate;
triphenylmethylium tetrakis(2,3,5,6-tetrafluorophenyl)borate;
benzene (diazonium) tetrakis(3,4,5-trifluorophenyl)borate;
tropillium tetrakis(3,4,5-trifluorophenyl)borate;
benzene (diazonium) tetrakis(3,4,5-trifluorophenyl)borate;
tropillium tetrakis(3,4,5-trifluorophenyl)aluminate;
triphenylmethylium tetrakis(3,4,5-trifluorophenyl)aluminate;
benzene (diazonium) tetrakis(3,4,5-trifluorophenyl)aluminate;
tropillinum tetrakis(1,2,2-trifluoroethenyl)borate;
triphenylmethylium tetrakis(1,2,2-trifluoroethenyl)borate;
benzene (diazonium) tetrakis(1,2,2-trifluoroethenyl)borate;
tropillium tetrakis(2,3,4,5-tetrafluorophenyl)borate;
triphenylmethylium tetrakis(2,3,4,5-tetrafluorophenyl)borate; and
benzene (diazonium) tetrakis(2,3,4,5-tetrafluorophenyl)borate.

Where the metal ligands include halide moieties, for example, (methyl-phenyl) silylene(tetra-methyl-cyclopentadienyl)(tert-butyl-amido) zirconium dichloride), which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for processes describing the reaction of alkyl aluminum compounds with dihalide substituted metallocene compounds prior to or with the addition of activating anionic compounds. For example, an aluminum alkyl compound may be mixed with the metallocene prior to its introduction into the reaction vessel. Since the alkyl aluminum is also suitable as a scavenger (as described below), its use in excess of that normally stoichiometrically required for akylation of the metallocene will permit its addition to the reaction solvent with the metallocene compound. Normally, alumoxane would not be added with the metallocene, so as to avoid premature activation, but can be added directly to the reaction vessel in the presence of the polymerizable monomers when serving as both scavenger and alkylating activator.

Alkylalumoxanes are additionally suitable as catalyst activators, particularly for those metallocenes having halide ligands. An alumoxane useful as a catalyst activator typically is an oligomeric aluminum compound represented by the general formula $(R-Al-O)_n$, which is a cyclic compound, or $R(R-Al-O)_nAlR_2$, which is a linear compound. In these formulae, each R or $R_2$ is a $C_1$ to $C_5$ alkyl radical, for example, methyl, ethyl, propyl, butyl or pentyl, and "n" is an integer from 1 to about 50. Most preferably, R is methyl and "n" is at least 4, i.e., methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Optionally, a scavenging compound is also used. The term "scavenging compound" as used herein refers to those compounds effective for removing polar impurities from the reaction solvent. Such impurities can be inadvertently introduced with any of the polymerization reaction components, particularly with solvent, monomer and comonomer feed, and adversely affect catalyst activity and stability by decreasing or even eliminating catalytic activity, particularly when a metallocene cation-noncoordinating anion pair is the catalyst system. The polar impurities, or catalyst poisons, include water, oxygen, oxygenated hydrocarbons, metal impurities, etc. Preferably, steps are taken before provision of such into the reaction vessel, for example, by chemical treatment or careful separation techniques after or during the synthesis or preparation of the various components, but some minor amounts of scavenging compound will still normally be required in the polymerization process itself. Typically, the scavenging compound will be an organometallic compound such as the Group-13 organometallic compounds of U.S. Pat. Nos. 5,153,157 and 5,241,025; EP-A-0 426 638; WO-A-91/09882; WO-A-94/03506; and WO-A-93/14132. Exemplary compounds include triethyl aluminum, triethyl borane, tri-isobutyl aluminum, isobutyl alumnumoxane, those having bulky substituents covalently bound to the metal or metalloid center being preferred to minimize adverse interaction with the active catalyst.

The catalyst system is optionally supported, typically on an inorganic oxide or chloride or a material such as polyethylene, polypropylene or polystyrene. These catalysts can include partially and/or fully activated precursor compositions. The catalysts may be modified by prepolymerization or encapsulation. Specific metallocenes and catalyst systems useful in practicing the invention are disclosed in WO 96/11961, and WO 96/11960. Other non-limiting examples of metallocene catalysts and catalyst systems are discussed in U.S. Pat. Nos. 4,808,561, 5,017,714, 5,055,438, 5,064, 802, 5,124,418, 5,153,157 and 5,324,800. Still other organometallic complexes and/or catalyst systems are described in Organometallics, 1999, 2046; PCT publications WO 96/23010, WO 99/14250, WO 98/50392, WO 98/41529, WO 98/40420, WO 98/40374, WO 98/47933; and European publications EP 0 881 233 and EP 0 890 581.

In a preferred embodiment, the VLDPE polymer is made using a gas-phase, metallocene-catalyzed polymerization process. As used herein, the term "gas phase polymerization" refers to polymerization of monomers in a fluidized bed. In this embodiment, the VLDPE polymer may be made by polymerizing alpha-olefins in the presence of a metallocene catalyst under reactive conditions in a gas phase reactor having a fluidized bed and a fluidizing medium. In a specific embodiment, the VLDPE polymer can be made by polymerization in a single reactor (as opposed to multiple reactors). As discussed in greater detail below, a variety of gas phase polymerization processes may be used. For example, polymerization may be conducted in uncondensed or "dry" mode, condensed mode, or "super-condensed mode." In a specific embodiment, the liquid in the fluidizing medium can be maintained at a level greater than 2 weight percent based on the total weight of the fluidizing medium.

The material exiting the reactor includes the VLDPE polymer and a stream containing unreacted monomer gases. Following polymerization, the polymer is recovered. In certain embodiments, the stream can be compressed and cooled, and mixed with feed components, whereupon a gas phase and a liquid phase are then returned to the reactor.

Generally, in carrying out the gas phase polymerization processes described herein, the reactor temperature can be in the range of 50° C. to 110° C., sometimes higher. However, the reactor temperature should not exceed the melting point of the VLDPE being formed. A typical reactor temperature is 80° C. The reactor pressure should be 100 to 1000 psig (0.7 to 7 MPa), preferably 150 to 600 psig (1 to 4 MPa), more preferably 200 to 500 psig (1.4 to 3.5 MPa) and most preferably 250 to 400 psig (1.7 to 2.8 MPa).

Preferably, the process is operated in a continuous cycle. A specific, non-limiting embodiment of the gas phase polymerization process that is operated in a continuous cycle will now be described, it being understood that other forms of gas polymerization may also be used.

A gaseous stream containing one or more monomers is continuously passed through a fluidized bed under reactive conditions in the presence of a catalyst as described above. This gaseous stream is withdrawn from the fluidized bed and recycled back into the reactor. Simultaneously, polymer product may be withdrawn from the reactor and new monomer or monomers are added to replace the reacted monomer(s). In one part of the cycle, in a reactor, a cycling gas stream is heated by the heat of polymerization. This heat is removed in another part of the cycle by a cooling system external to the reactor. Heat generated by the reaction may be removed in order to maintain the temperature of the gaseous stream inside the reactor at a temperature below the polymer and catalyst degradation temperatures. Further, it is often desirable to prevent agglomeration or formation of chunks of polymer that cannot be removed as product. This may be accomplished in a variety of ways known in the art, such as, for example, through control of the temperature of the gaseous stream in the reaction bed to a temperature below the fusion or sticking temperature of the polymer particles produced during the polymerization reaction.

Heat should be removed, since the amount of polymer produced in the fluidized bed polymerization process is generally related to the amount of heat that can be withdrawn from a reaction zone in a fluidized bed within the reactor. During the gas phase polymerization process, heat can be removed from the gaseous recycle stream by cooling the stream outside the reactor. The velocity of the gaseous recycle stream in a fluidized bed process should be sufficient to maintain the fluidized bed in a fluidized state. In certain conventional fluidized bed reactors, the amount of fluid circulated to remove the heat of polymerization is often greater than the amount of fluid required for support of the fluidized bed and for adequate mixing of the solids in the fluidized bed. However, to prevent excessive entrainment of solids in a gaseous stream withdrawn from the fluidized bed, the velocity of the gaseous stream should be regulated.

The recycle stream can be cooled to a temperature below the dew point, resulting in condensing a portion of the recycle stream, as described in U.S. Pat. Nos. 4,543,399 and 4,588,790. As set forth in those patents, the resulting stream containing entrained liquid should be returned to the reactor without the aforementioned agglomeration and/or plugging that may occur when a liquid is introduced during the fluidized bed polymerization process. For purposes of this patent, this intentional introduction of a liquid into a recycle stream or reactor during the process is referred to generally as a "condensed mode" operation of the gas phase polymerization process. As taught by the above mentioned patents, when a recycle stream temperature is lowered to a point below its dew point in condensed mode operation, an increase in polymer production is possible, as compared to production in a "non-condensing" or "dry" mode, because of increased cooling capacity. Also, a substantial increase in space time yield, the amount of polymer production in a given reactor volume, can be achieved by operating in condensed mode with little or no change in product properties. Also, in certain condensed mode operations, the liquid phase of the two-phase gas/liquid recycle stream mixture remains entrained or suspended in the gas phase of the mixture. The cooling of the recycle stream to produce this two-phase mixture results in a liquid/vapor equilibrium. Vaporization of the liquid occurs when heat is added or pressure is reduced. The increase in space time yields are the result of this increased cooling capacity of the recycle stream which, in turn, is due both to the greater temperature differential between the entering recycle stream and the fluidized bed temperature and to the vaporization of condensed liquid entrained in the recycle stream. In a specific non-limiting embodiment of the process described herein, a condensed mode of operation is utilized.

In operating the gas phase polymerization process to obtain the VLDPE polymer, the amount of polymer and catalyst, the operating temperature of the reactor, the ratio of comonomer(s) to monomer and the ratio of hydrogen to monomer should be determined in advance, so that the desired density and melt index can be achieved.

Although a variety of gas polymerization processes may be used to make the polyolefins of the present inventions, including non-condensed or dry mode, it is preferred to use any one of a variety of condensed mode processes, including the condensed mode processes described in the above patents, as well as improved condensed mode gas polymerization processes, such as those disclosed in U.S. Pat. Nos. 5,462,999, and 5,405,922. Other types of condensed mode processes are also applicable, including so-called "super-condensed mode" processes, as discussed in U.S. Pat. Nos. 5,352,749 and 5,436,304.

The condensable fluids that can be used in one of the condensed mode gas phase polymerization operations may include saturated or unsaturated hydrocarbons. Examples of suitable inert condensable fluids are readily volatile liquid hydrocarbons, which may be selected from saturated hydrocarbons containing from 2 to 8 carbon atoms. Some suitable saturated hydrocarbons are propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, or mixtures thereof. The preferred inert condensable hydrocarbons are $C_4$ and $C_6$ saturated hydrocarbons. The condensable fluids may also include polymerizable condensable comonomers such as olefins, alpha-olefins, diolefins, diolefins containing at least one alpha-olefin or mixtures thereof including some of the aforementioned monomers which may be partially or entirely incorporated into the polymer product.

The preferred gas-phase, metallocene VLDPE polymers can be further characterized by a narrow composition distribution. As is well known to those skilled in the art, the composition distribution of a copolymer relates to the uniformity of distribution of comonomer among the molecules of the polymer. Metallocene catalysts are known to incorporate comonomer very evenly among the polymer molecules they produce. Thus, copolymers produced from a catalyst system having a single metallocene component have a very narrow composition distribution, in that most of the polymer molecules will have roughly the same comonomer content, and within each molecule the comonomer will be randomly distributed. By contrast, conventional Ziegler-Natta catalysts generally yield copolymers having a considerably broader composition distribution, with comonomer inclusion varying widely among the polymer molecules.

A measure of composition distribution is the "Composition Distribution Breadth Index" ("CDBI"). The definition of Composition Distribution Breadth Index (CDBI), and the method of determining CDBI, can be found in U.S. Pat. No. 5,206,075 and PCT publication WO 93/03093. From the weight fraction versus composition distribution curve, the CDBI is determined by establishing the weight percentage of a sample that has a comonomer content within 50% of the median comonomer content on each side of the median. The CDBI of a copolymer is readily determined utilizing well known techniques for isolating individual fractions of a sample of the copolymer. One such technique is Temperature Rising Elution Fractionation (TREF) as described in Wild, et al., *J. Poly. Sci., Poly. Phys. Ed.*, vol. 20, p. 441 (1982).

To determine CDBI, a solubility distribution curve is first generated for the copolymer. This may be accomplished using data acquired from the TREF technique described above. This solubility distribution curve is a plot of the weight fraction of the copolymer that is solubilized as a function of temperature. This is converted to a weight fraction versus composition distribution curve. For the purpose of simplifying the correlation of composition with elution temperature, all fractions are assumed to have a $Mn \geq 15,000$, where Mn is the number average molecular weight of the fraction. Any low weight fractions present generally represent a trivial portion of the VLDPE polymers. The remainder of this description and the appended claims maintain this convention of assuming all fractions have $Mn \geq 15,000$ in the CDBI measurement.

The VLDPE polymers can also be characterized by molecular weight distribution (MWD). Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight, Mz/Mw.

Mz, Mw and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975) 287–368; Rodriguez, F., *Principles of Polymer Systems* 3rd ed., Hemisphere Pub. Corp., NY, (1989) 155–160; U.S. Pat. No. 4,540,753; Verstrate et al., *Macromolecules*, vol. 21, (1988) 3360; and references cited therein.

The VLDPE polymers are preferably linear polymers without long chain branching. As used in the present disclosure, the term "linear" is applied to a polymer that has a linear backbone and does not have long chain branching; i.e., a "linear" polymer is one that does not have the long chain branches characteristic of a SLEP polymer as defined in U.S. Pat. Nos. 5,272,236 and 5,278,272. Thus, a "substantially linear" polymer as disclosed in those patents is not a "linear" polymer because of the presence of long chain branching.

One embodiment of the VLDPE polymers have one or more of the following characteristics, in addition to the density and other parameters described herein:

(a) a composition distribution CDBI of 50 to 85%, alternatively 60 to 80%, or 55 to 75%, or 55% or more to 70% or less;

(b) a molecular weight distribution Mw/Mn of 2 to 3, alternatively 2.2 to 2.8;

(c) a molecular weight distribution Mz/Mw of less than 2; and (d) the presence of two peaks in a TREF measurement.

Particularly preferred VLDPEs having some or all of these characteristics are the gas phase metallocene-produced VLDPEs described above.

Two peaks in the TREF measurement as used in this specification and the appended claims means the presence of two distinct normalized ELS (evaporation mass light scattering) response peaks in a graph of normalized ELS response (vertical or y axis) versus elution temperature (horizontal or x axis with temperature increasing from left to right) using the TREF method disclosed in the EXAMPLES section below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. Preferably, the two distinct peaks are at least 3° C. apart, more preferably at least 4° C. apart, even more preferably at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. Two peaks on such a graph indicates a bimodal composition distribution (CD). Bimodal CD may also be determined by other methods known to those skilled in the art. One such alternate method for TREF measurement than can be used if the above method does not show two peaks is disclosed in B. Monrabal, "Crystallization Analysis Fractionation: A New Technique for the Analysis of Branching Distribution in Polyolefins," Journal of Applied Polymer Science, Vol. 52, 491–499 (1994).

A preferred balance of properties, particularly in film applications, according to the invention is achieved when the long chain branching of the VLDPE is reduced. Therefore, with respect to the catalyst structures described above, bis-Cp structures are preferred over mono-Cp structures, unbridged structures are preferred over bridged structures, and unbridged bis-Cp structures are the most preferred. Preferred catalyst systems which will minimize or eliminate long chain branching to produce polymers substantially free of or free of long chain branching are based on un-bridged bis-Cp zirconocenes, such as but not limited to bis(1-methyl-3-n-butyl cyclopentadiane)zirconium dichloride.

Symmetric metallocenes may be used to produce a VLDPE polymer of the present invention. Symmetric metallocenes include, but are not limited to, bis(methylcyclopentadienyl)zirconium dichloride, bis(1,3-dimethylcyclopentadienyl)zirconium dichloride, bis(1,2-dimethylcyclopentadienyl)zirconium dichloride, bis(1,2,4-trimethylcyclopentadienyl)zirconium dichloride, bis(1,2,3-trimethylcyclopentadienyl)zirconium dichloride, bis(tetramethylcyclopentadienyl)zirconium dichloride, bis(pentamethylcyclopentadienyl)zirconium dichloride, bis(ethylcyclopentadienyl)zirconium dichloride, bis(propylcyclopentadienyl)zirconium dichloride, bis(butylcyclopentadienyl)zirconium dichloride, bis(isobutylcyclopentadienyl)zirconium dichloride, bis(pentylcyclopentadienyl)zirconium dichloride, bis(isopentylcyclopentadienyl)zirconium dichloride, bis(cyclopentylcyclopentadienyl)zirconium dichloride, bis(phenylcyclopentadienyl)zirconium dichloride, bis(benzylcyclopentadienyl)zirconium dichloride, bis(trimethylsilylmethylcyclopentadienyl)zirconium dichloride, bis(cyclopropylmethylcyclopentadienyl)zirconium dichloride, bis(cyclopentylmethylcyclopentadienyl)zirconium dichloride, bis(cyclohexylmethylcyclopentadienyl)zirconium dichloride, bis(propenylcyclopentadienyl)zirconium dichloride, bis(butenylcyclopentadienyl)zirconium dichloride, bis(1,3-ethylmethylcyclopentadienyl)zirconium dichloride, bis(1,3-propylmethylcyclopentadienyl)zirconium dichloride, bis(1,3-butylmethylcyclopentadienyl)zirconium dichloride, bis(1,3-isopropylmethylcyclopentadienyl)zirconium dichloride, bis(1,3-isobutylmethylcyclopentadienyl)zirconium dichloride, bis(1,3-methylcyclopentylcyclopentadienyl)zirconium dichloride, and bis(1,2,4-dimethylpropylcyclopentadienyl)zirconium dichloride.

Unsymmetric metallocenes may be used to produce a VLDPE polymer of the present invention. Unsymmetric metallocenes include, but are not limited to, cyclopentadienyl(1,3-dimethylcyclopentadienyl)zirconium dichloride, cyclopentadienyl(1,2,4-trimethylcyclopentadienyl)zirconium dichloride, cyclopentadienyl(tetramethylcyclopentadienyl)zirconium dichloride, cyclopentadienyl(pentamethylcyclopentadienyl)zirconium dichloride, cyclopentadienyl(propylcyclopentadienyl)zirconium dichloride, cyclopentadienyl(butylcyclopentadienyl)zirconium dichloride, cyclopentadienyl(pentylcyclopentadienyl)zirconium dichloride, cyclopentadienyl(isobutylcyclopentadienyl)zirconium dichloride, cyclopentadienyl(cyclopentylcyclopentadienyl)zirconium dichloride, cyclopentadienyl(isopentylcyclopentadienyl)zirconium dichloride, cyclopentadienyl(benzylcyclopentadienyl)zirconium dichloride, cyclopentadienyl(phenylcyclopentadienyl)zirconium dichloride, cyclopentadienyl(1,3-propylmethylcyclopentadienyl)zirconium dichloride, cyclopentadienyl(1,3-butylmethylcyclopentadienyl)zirconium dichloride, cyclopentadienyl(1,3-isobutylmethylcyclopentadienyl)zirconium dichloride, cyclopentadienyl(1,2,4-dimethylpropylcyclopentadienyl)zirconium dichloride, (tetramethylcyclopentadienyl)(methylcyclopentadienyl)zirconium dichloride, (tetramethylcyclopentadienyl)(1,3-dimethylcyclopentadienyl)zirconium dichloride, (tetramethylcyclopentadienyl)(1,2,4-trimethylcyclopentadienyl)zirconium dichloride, (tetramethylcyclopentadienyl)(propylcyclopentadienyl)zirconium dichloride, (tetramethylcyclopentadienyl)(cyclopentylcyclopentadienyl)zirconium dichloride, (pentamethylcyclopentadienyl)(methylcyclopentadienyl)zirconium dichloride, (pentamethylcyclopentadienyl)(1,3-dimethylcyclopentadienyl)zirconium dichloride, (pentamethylcyclopentadienyl)(>1,2,4-trimethylcyclopentadienyl)zirconium dichloride, (pentamethylcyclopentadienyl)(propylcyclopentadienyl)zirconium dichloride, (pentamethylcyclopentadienyl)(cyclopentylcyclopentadienyl)zirconium dichloride, cyclopentadienyl(ethyltetramentylcyclopentadienyl)zirconium dichloride, cyclopentadienyl(propyltetramentylcyclopentadienyl)zirconium dichloride, (methylcyclopentadienyl)(propyltetramentylcyclopentadienyl)zirconium dichloride, (1,3-dimethylcyclopentadienuyl)(propyltetramentylcyclopentadienyl)zirconium dichloride, (1,2,4-trimethylcyclopentadienyl)(propyltetramentylcyclopentadienyl)zirconium dichloride, (propylcyclopentadienyl)(propyltetramentylcyclopentadienyl)zirconium dichloride, cyclopentadienyl(indenyl)zirconium dichloride, (methylcyclopentadienyl)(indenyl)zirconium dichloride, (1,3-dimethylcyclopentadienyl)(indenyl)zirconium dichloride, (1,2,4-trimethylcyclopentadienyl)(indenyl)zirconium dichloride, (tetramethylcyclopentadienyl)(indenyl)zirconium dichloride, (pentamethylcyclopentadienyl)(indenyl)zirconium dichloride, cyclopentadienyl(1-methylindenyl)zirconium dichloride, cyclopentadienyl(1,3-dimethylindenyl)zirconium dichloride, cyclopentadienyl(1,2,3-trimethylindenyl)zirconium dichloride, cyclopentadienyl(4,7-dimethylindenyl)zirconium dichloride, (tetramethylcyclopentadienyl)(4,7-dimethylinde>nyl)zirconium dichloride, (pentamethylcyclopentadienyl)(4,7-dimethylindenyl)zirconium dichloride, cyclopentadienyl(5,6-dimethylindenyl)zirconium dichloride, (pentamethylcyclopentadienyl)(5,6-dimethylindenyl)zirconium dichloride, and (tetramethylcyclopentadienyl)(5,6-dimethylindenyl)zirconium dichloride.

The preferred method for producing the catalyst of the invention is described below and can be found in U.S. application Ser. Nos. 265,533, filed Jun. 24, 1994, now abandoned, and 265,532, filed Jun. 24, 1994, now abandoned, both are hereto fully incorporated by reference in their entirety. In a preferred embodiment, the metallocene catalyst component is typically slurried in a liquid to form a metallocene solution and a separate solution is formed containing an activator and a liquid. The liquid can be any compatible solvent or other liquid capable of forming a solution or the like with at least one metallocene catalyst component and/or at least one activator. In the preferred embodiment the liquid is a cyclic aliphatic or aromatic hydrocarbon, most preferably toluene. The metallocene and activator solutions are preferably mixed together and added to a porous support such that the total volume of the metallocene solution and the activator solution or the metallocene and activator solution is less than four times the pore volume of the porous support, more preferably less than three times, even more preferably less than two times, and more preferably in the 1–1.5 times to 2.5–4 times range and most preferably in the 1.5 to 3 times range. Also, in the preferred embodiment, an antistatic agent is added to the catalyst preparation.

In one embodiment, the metallocene catalyst is prepared from silica dehydrated at 600° C. The catalyst is a commercial scale catalyst prepared in a mixing vessel with and agitator. An initial charge of 1156 pounds (462 Kg) toluene is added to the mixer. This was followed by mixing 925 pounds (421 Kg) of 30 percent by weight methyl aluminoxane in toluene. This is followed with 100 pounds (46 Kg) of 20 percent by weight bis(1,3-methyl-n-butyl cyclopentadienyl) zirconium dichloride in toluene (20.4 pounds (9.3 Kg)

of contained metallocene). An additional 144 pounds (66 Kg) of toluene is added to the mixer to rinse the metallocene feed cylinder and allowed to mix for 30 minutes at ambient conditions. This is followed by 54.3 pounds (25 Kg) of an AS-990 in toluene, surface modifier solution, containing 5.3 pounds (2.4 Kg) of contained AS-990. An additional 100 pounds (46 Kg) of toluene rinsed the surface modifier container and was added to the mixer. The resulting slurry is vacuum dried at 3.2 psia (70.6 kPa) at 175° F. (79° C.) to a free flowing powder. The final catalyst weight was 1093 pounds (497 Kg). The catalyst can have a final zirconium loading of 0.40% and an aluminum loading of 12.0%.

In one preferred embodiment a substantially homogenous catalyst system is preferred. For the purposes of this patent specification and appended claims, a "substantially homogenous catalyst" is one in which the mole ratio of the transition metal of the catalyst component, preferably with an activator, is evenly distributed throughout a porous support.

The procedure for measuring the total pore volume of a porous support is well known in the art. Details of one of these procedures is discussed in Volume 1, Experimental Methods in Catalytic Research (Academic Press, 1968) (specifically see pages 67–96). This preferred procedure involves the use of a classical BET apparatus for nitrogen absorption. Another method well know in the art is described in Innes, Total porosity and Particle Density of Fluid Catalysts By Liquid Titration, Vol. 28, No. 3, Analytical Chemistry 332–334 (March, 1956).

The mole ratio of the metal of the activator component to the transition metal of the metallocene component is in the range of ratios between 0.3:1 to 1000:1, preferably 20:1 to 800:1, and most preferably 50:1 to 500:1. Where the activator is an ionizing activator as previously described the mole ratio of the metal of the activator component to the transition metal component is preferably in the range of ratios between 0.3:1 to 3:1. component to the transition metal component is preferably in the range of ratios between 0.3:1 to 3:1.

Typically in a gas phase polymerization process a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See for example U.S. Pat. Nos. 4,543,399, 4,588,790, 5,028,670, 5,352,749, 5,405,922, 5,436,304, 5,453,471 and 5,462,999 all of which are fully incorporated herein by reference.)

Generally in a gas fluidized bed process for producing polymer from monomers a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and new or fresh monomer is added to replace the polymerized monomer.

In one embodiment of the process of the invention the process is essentially free of a scavenger. For the purposes of this patent specification and appended claims the term "essentially free" means that during the process of the invention no more than 10 ppm of a scavenger based on the total weight of the recycle stream is present at any given point in time during the process of the invention.

In another embodiment of the process of the invention the process is substantially free of a scavenger. For the purposes of this patent specification and appended claims the term "substantially free" is defined to be that during the process of the invention no more than 50 ppm of a scavenger based on the total weight of a fluidized bed is present at any given point in time during the process of the invention.

In one embodiment during reactor start-up to remove impurities and ensure polymerization is initiated, a scavenger is present in an amount less than 300 ppm, preferably less than 250 ppm, more preferably less than 200 ppm, even more preferably less than 150 ppm, still more preferably less than 100 ppm, and most preferably less than 50 ppm based on the total bed weight of a fluidized bed during the first 12 hours from the time the catalyst is placed into the reactor, preferably up to 6 hours, more preferably less than 3 hours, even more preferably less than 2 hours, and most preferably less than 1 hour and then the introduction of the scavenger is halted.

In another embodiment of the process of the invention the scavenger is present in an amount sufficient until the catalyst of the invention has achieved a catalyst productivity on a weight ratio basis of greater than 1000 grams of polymer per gram of the catalyst, preferably greater than about 1500, more preferably greater than 2000, even more preferably greater than 2500, and most preferably greater than 3000.

In another embodiment of the process of the invention during start-up the scavenger is present in an amount sufficient until the catalyst of the invention has achieved a catalyst productivity 40 percent of that of steady-state, preferably less than 30 percent, even more preferably less than 20 percent and most preferably less than 10 percent. For the purposes of this patent specification and appended claims "steady state" is the production rate, weight of polymer being produced per hour.

The productivity of the catalyst or catalyst system is influenced by the main monomer, (i.e., ethylene or propylene) partial pressure. The preferred mole percent of the monomer, ethylene or propylene, is from about 25 to 90 mole percent and the monomer partial pressure is in the range of from about 75 psia (517 kPa) to about 300 psia (2069 kPa), which are typical conditions in a gas phase polymerization process.

When a scavenger is utilized in the process of the invention the scavenger can be introduced typically into the reactor directly or indirectly into the recycle stream or into any external means capable of introducing the scavenger into the reactor. Preferably the scavenger enters into the reactor directly, and most preferably directly into the reactor bed or below the distributor plate in a typical gas phase process, preferably after the bed is in a fluidized state. In one embodiment the scavenger can be introduced once, intermittently or continuously to the reactor system.

The scavenger used in the process of the invention is introduced to the reactor at a rate equivalent to 10 ppm to 100 ppm based on the steady state, production rate, and then scavenger introduction is stopped.

In yet another embodiment particularly during start-up the scavenger when used is introduced at a rate sufficient to provide an increase in catalyst productivity on a weight ratio basis of a rate of 200 grams of polymer per gram of catalyst per minute, preferably at a rate of 300, even more preferably at a rate of 400 and most preferably at a rate of 500.

In another embodiment, the mole ratio of the metal of the scavenger to the transition metal of the metallocene catalyst component equals about, about 0.2 multiplied by the ppm of a scavenger based on the production rate multiplied by the catalyst productivity in kilograms of polymer per gram of catalyst. The range of the mole ratio is from about 300 to 10. In a preferred embodiment, where an alkyl aluminum is used as the scavenger the mole ratio is represented as aluminum (Al) to transition metal, for example, zirconium, where the moles of. Al are based on the total amount of scavenger used.

It is also preferred that hydrogen not be added to the system simultaneously with the scavenger. It is also within the scope of this invention that the scavenger can be introduced on a carrier separate from that used when a supported metallocene catalyst system is used in the process of the invention.

Fines for the purpose of this patent specification and appended claims are polymer particles less than 125 mu in size. Fines of this size can be measured by using a standard 120 mesh unit sieve screen. In a preferred embodiment the amount of scavenger present in the reactor at any given point in time during the process of the invention the level of fines less than 125 mu is less than 10%, preferably less than 1%, more preferably less than 0.85% to less than 0.05%.

It is within the scope of the invention that a system external to the reactor for removing scavengers introduced in the process of the invention from the recycle stream may be used. This would then prevent the recycle of the scavenger back into the reactor and prevent scavenger build-up in the reactor system. It is preferred that such a system is placed prior to the heat exchanger or compressor in the recycle stream line. It is contemplated that such a system would condense the scavenger out of the fluidizing medium in the recycle stream line. It would be preferred that the fluidizing medium is treated to remove the scavenger, see for example U.S. Pat. No. 4,460,755, incorporated herein by reference.

It is also contemplated by the process of the invention that scavenger can be intermittently introduced during the process wherein greater than 90%, preferably greater than 95% of all the scavenger introduced is removed from the recycle stream. It is also contemplated by this invention that the catalyst or catalyst system or components thereof of the invention can be used upon start-up as a scavenger, however, this would be an expensive procedure.

In the most preferred embodiment of the invention the process is a gas phase polymerization process operating in a condensed mode. For the purposes of this patent specification and appended claims the process of purposefully introducing a recycle stream having a liquid and a gas phase into a reactor such that the weight percent of liquid based on the total weight of the recycle stream is greater than about 2.0 weight percent is defined to be operating a gas phase polymerization process in a "condensed mode".

In one embodiment of the process of the invention the weight percent of liquid in the recycle stream based on the total weight of the recycle stream is in the range of about 2 to about 50 weight percent, preferably greater than 10 weight percent and more preferably greater than 15 weight percent and even more preferably greater than 20 weight percent and most preferably in the range between about 20 and about 40 percent. However, any level of condensed can be used depending on the desired production rate.

In another embodiment of the process of the invention the amount of scavenger utilized if any is used should be in a mole ratio less than 100, preferably less than 50, more preferably less than about 25 based on the mole ratio of the metal of the transition metal scavenger to the transition metal of the metallocene where the scavenger is an aluminum containing organometallic compound and the transition metal of the metallocene is a Group 4 metal then the mole ratio above is based on the moles of aluminum to the moles of the Group 4 metal of the catalyst.

Fouling is a term used to describe the collection of polymer deposits on surfaces in a reactor. Fouling is detrimental to all parts of a polymerization process, including the reactor and its associated systems, hardware, etc. Fouling is especially disruptive in areas restricting gas flow or liquid flow. The two major areas of primary concern are the heat exchanger and distributor plate fouling. The heat exchanger consists of a series of small diameter tubes arranged in a tube bundle. The distributor plate is a solid plate containing numerous small diameter orifices through which the gas contained in a recycle stream is passed through before entering the reaction zone or distributed into a bed of solid polymer in a fluidized bed reactor such as described in U.S. Pat. No. 4,933,149, incorporated herein by reference.

Fouling manifests itself as an increase in the pressure drop across either the plate, cooler, or both. Once the pressure drop becomes too high, gas or liquid can no longer be circulated efficiently by the compressor, and it is often necessary to shut the reactor down. Cleaning out the reactor can take several days and is very time consuming and costly. Fouling can also occur in the recycle gas piping and compressor, but usually accompanies plate and cooler fouling.

To quantify the rate of fouling it is useful to define a fouling factor, F. F is the fraction of the area of a hole that is fouled. If F=0 (0%) then there is no fouling. Conversely, if F=1 (100%) the hole is completely plugged. It is possible to relate the fouling to the pressure drop, DELTA P, at a given time in terms of the pressure drop of a clean system, DELTA P0. As fouling increases DELTA P increases and is larger than the initial pressure drop, DELTA P0. F is given by the following expressions: [See equation in original] (I) Cooler Fouling [See Original Patent for Chemical Structure Diagram] (II) In general, when F is greater than about 0.3 to about 0.4 (30–40%) a reactor shutdown is inevitable. Preferably, F is less than 40%, preferably less than 30%, even more preferably less than 20%, still more preferably less than 15% and most preferably less than 10% to 0%. The rate of fouling, the change in F as a function of time, is used to quantify fouling. If no fouling occurs the rate of fouling is zero. A minimum acceptable rate of fouling for a commercial operation is about 12 percent/month or 0.4 percent/day, preferably less than 0.3 percent/day, even more preferably less than 0.2 percent/day and most preferably less than 0.1 percent/day.

Particle size is determined as follows; the particle size is measured by determining the weight of the material collected on a series of U.S. Standard sieves and determining the weight average particle size.

Fines are defined as the percentage of the total distribution passing through 120 mesh standard sieve.

In one embodiment, the process is operated using a metallocene catalyst based on bis(1,3-methyl-n-butyl cyclopentadienyl)zirconium dichloride is described in this example. It shows the fouling effect of operating a commercial reactor using TEAL. This example includes information from a startup of a commercial reactor on metallocene catalyst.

Possible optimizations of the gas phase polymerization process and additional catalyst preparations are disclosed in U.S. Pat. Nos. 5,763,543, 6,087,291, and 5,712,352, and PCT published applications WO 00/02930 and WO 00/02931.

Although the VLPDE polymer component of the VLDPE/LLDPE blends of the invention has been discussed as a single polymer, blends of two or more such VLDPE polymers, preferably two or more m-VLDPE polymers, having the properties described herein are also contemplated.

4.2 The LLDPE Component

The polymer blend also includes a linear low density polyethylene (LLDPE) polymer. As used herein, the terms "linear low density polyethylene" polymer and "LLDPE" polymer refer to a homopolymer or preferably copolymer of ethylene having a density of from 0.916 to 0.940 g/cm$^3$. Polymers having more than two types of monomers, such as terpolymers, are also included within the term "copolymer" as used herein. The comonomers that are useful in general for making LLDPE copolymers include α-olefins, such as $C_3$–$C_{20}$ α-olefins and preferably $C_3$–$C_{12}$ α-olefins. The α-olefin comonomer can be linear or branched, and two or more comonomers can be used, if desired. Examples of suitable comonomers include linear $C_3$–$C_{12}$ α-olefins, and α-olefins having one or more $C_1$–$C_3$ alkyl branches, or an aryl group. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene.

Other useful comonomers include polar vinyl, conjugated and non-conjugated dienes, acetylene and aldehyde monomers, which can be included in minor amounts in terpolymer compositions. Non-conjugated dienes useful as co-monomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB).

The amount of comonomer used will depend upon the desired density of the LLDPE polymer and the specific comonomers selected. One skilled in the art can readily determine the appropriate comonomer content appropriate to produce an LLDPE polymer having a desired density.

The LLDPE polymer has a density of 0.916 g/cm$^3$ to 0.940 g/cm$^3$, and preferably from 0.916 g/cm$^3$ to 0.925 g/cm$^3$. The LLDPE polymer can have a melt index of from 0.5 to 20 g/10 min (dg/min), as measured in accordance with ASTM-1238 condition E. Alternative lower limits for the melt index include 0.7 and 1.0 g/10 min, and alternative upper limits for the melt index include 5, 10, 12 and 15 g/10 min, with melt index ranges from any lower limit to any upper limit being within the scope of the invention.

The LLDPE polymer can be produced using any conventional polymerization process and suitable catalyst, such as a Ziegler-Natta catalyst or a metallocene catalyst. Metallocene-catalyzed LLDPEs (m-LLDPE) are preferred. Particularly preferred m-LLDPEs are the gas-phase, metallocene catalyzed LLDPEs described in WO 94/26816. Examples of suitable LLDPEs include the metallocene LLDPEs commercially available under the trade name EXCEED™ from ExxonMobil Chemical Co., Houston, Tex., the Ziegler-Natta LLDPEs available as ExxonMobil LL series LLDPEs, from ExxonMobil Chemical Co., Houston, Tex., and the DOWLEX™ LLDPE resins available from Dow Chemical Co.

Although the LLPDE polymer component of the VLDPE/LLDPE blends of the invention has been discussed as a single polymer, blends of two or more such LLDPE polymers, preferably two or more metallocene-catalyzed LLDPE polymers, having the properties described herein are also contemplated.

4.3 VLDPE-LLDPE Blends

In one embodiment, the present invention provides a polymer blend, the blend including a VLDPE polymer and an LLDPE polymer. The blend can include any of the VLDPE polymers described herein, preferably a metallocene-catalyzed VLDPE polymer, and more preferably a gas-phase produced metallocene catalyzed VLDPE polymer. The blend can include any of the LLDPE polymers described herein, preferably a metallocene-catalyzed LLDPE polymer, and more preferably a gas-phase produced metallocene catalyzed LLDPE polymer.

The blends can be formed using conventional equipment and methods, such a by dry blending the individual components and subsequently melt mixing in a mixer, or by mixing the components together directly in a mixer, such as a Banbury mixer, a Haake mixer, a Brabender internal mixer, or a single or twin-screw extruder including a compounding extruder and a side-arm extruder used directly downstream of a polymerization process. Additionally, additives can be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates and hydrogenated rosins; UV stabilizers; heat stabilizers; antiblocking agents; release agents; anti-static agents; pigments; colorants; dyes; waxes; silica; fillers; talc and the like.

The blends include at least 5 weight percent and up to 85 weight percent of the VLDPE polymer, and at least 15 weight percent and up to 95 weight percent of the LLDPE polymer, with these weight percents based on the total weight of the VLDPE and LLDPE polymers of the blend. Alternative lower limits of the VLDPE polymer can be 10%, 20%, 30% or 40% by weight. Alternative upper limits of the VLDPE polymer can be 80%, 70%, 60% or 50% by weight. Ranges from any lower limit to any upper limit are within the scope of the invention. Preferred blends include from 5 to 85%, alternatively from 10–50% or from 10–30% by weight of the VLDPE polymer. The balance of the weight percentage is the weight of the LLDPE polymer component.

In one preferred embodiment, the polymer blend includes a metallocene-catalyzed VLDPE polymer having a density of less than 0.916 g/cm$^3$, and an LLDPE polymer having a density of from 0.916 to 0.940 g/cm$^3$.

In another preferred embodiment, the polymer blend includes a gas-phase metallocene-produced VLDPE polymer, the VLDPE polymer being a copolymer of ethylene and at least one $C_3$ to $C_{12}$ alpha olefin and having a density of from 0.900 to 0.915 g/cm$^3$ and a melt index of from 0.5 to 20 g/10 min; and a metallocene-produced LLDPE polymer, the LLDPE polymer being a copolymer of ethylene and at least one $C_3$ to $C_{12}$ alpha olefin and having a density of from 0.916 to 0.925 g/cm$^3$ and a melt index of from 0.5 to 20 g/10 min, wherein the blend includes 5–85% by weight of the VLDPE polymer and 95–15% by weight of the LLDPE polymer, preferably 10–50% by weight of the VLDPE polymer and 90–50% by weight of the LLDPE polymer, based on the total weight of the VLDPE and LLDPE polymers.

In any of these embodiments, the VLDPE polymer, the LLDPE polymer, or both, can be blends of such polymers. I.e., the VLDPE polymer component of the blend can itself be a blend of two or more VLDPE polymers having the characteristics described herein, and alternatively or additionally, the LLDPE polymer component of the blend can itself be a blend of two or more LLDPE polymers having the characteristics described herein.

4.4 Films

Polymer blends of the present invention are particularly suitable for film applications. It has been surprisingly found that films formed from polymer blends of the invention exhibit improved properties, particularly improved dart impact and puncture properties, relative to conventional films. The VDLPE/LLDPE polymer blends of the invention can be used to form cast or blown films having a single layer (monolayer films) or multiple layers (multilayer films). When used in multilayer films, the VLDPE/LLDPE polymer blends can be used in any layer of the film, or in more than one layer of the film, as desired. When more than one layer of the film is formed of a VLDPE/LLDPE polymer blend of the present invention, each such layer can be individually formulated; i.e., the layers formed of the VLDPE/LLDPE polymer can be the same or different chemical composition, density, melt index, thickness, etc., depending upon the desired properties of the film.

To facilitate discussion of different film structures of the invention, the following notation is used herein. Each layer of a film is denoted "A" or "B", where "A" indicates a conventional film layer as defined below, and "B" indicates a film layer formed of any of the VLDPE/LLDPE polymer blends of the present invention. Where a film includes more than one A layer or more than one B layer, one or more prime symbols (', ", "', etc.) are appended to the A or B symbol to indicate layers of the same type (conventional or inventive) that can be the same or can differ in one or more properties, such as chemical composition, density, melt index, thickness, etc., within the range of these parameters defined herein. Finally, the symbols for adjacent layers are separated by a slash (/). Using this notation, a three-layer film having an inner layer of a VLDPE/LLDPE polymer blend of the invention disposed between two outer, conventional film layers would be denoted A/B/A'. Similarly, a five-layer film of alternating conventional/inventive layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A" film, for purposes of the present invention. The relative thickness of each film layer is similarly denoted, with the thickness of each layer relative to a total film thickness of 100 (dimensionless) is indicated numerically and separated by slashes; e.g., the relative thickness of an A/B/A' film having A and A' layers of 10 µm each and a B layer of 30 µm is denoted as 20/60/20.

For the various films described herein, the "A" layer can be formed of any material known in the art for use in multilayer films or in film-coated products. Thus, for example, the A layer can be formed of a polyethylene homopolymer or copolymer, and the polyethylene can be, for example, a VLDPE, a low density polyethylene (LDPE), an LLDPE, a medium density polyethylene (MDPE), or a high density polyethylene (HDPE), as well as other polyethylenes known in the art. The polyethylene can be produced by any suitable process, including metallocene-catalyzed processes and Ziegler-Natta catalyzed processes. Further, the A layer can be a blend of two or more such polyethylenes, and can include additives known in the art. Further, one skilled in the art will understand that the layers of a multilayer film must have the appropriate viscosity match.

In multilayer structures, one or more A layers can also be an adhesion-promoting tie layer, such as PRIMACOR™ ethylene-acrylic acid copolymers available from The Dow Chemical Co., and/or ethylene-vinyl acetate copolymers. Other materials for A layers can be, for example, foil, nylon, ethylene-vinyl alcohol copolymers, polyvinylidene chloride, polyethylene terephthalate, oriented polypropylene, ethylene-vinyl acetate copolymers, ethylene-acrylic acid copolymers, ethylene-methacrylic acid copolymers, graft modified polymers, other polyethylenes, such as HDPE, LDPE, LMDPE, and MDPE, and paper.

The "B" layer is formed of a VLDPE/LLDPE polymer blend of the invention, and can be any of such blends described herein. In one embodiment, the B layer is formed of a blend of a metallocene-catalyzed VLDPE polymer having a density of less than 0.916 g/cm$^3$ and an LLDPE polymer having a density of from 0.916 to 0.940 g/cm$^3$. In another embodiment, the B layer is formed of a blend comprising: (a) a gas-phase metallocene-produced VLDPE copolymer of ethylene and at least one $C_3$ to $C_{12}$ alpha olefin and having a density of from 0.900 to 0.915 g/cm$^3$ and a melt index of from 0.5 to 10 g/10 min; and (b) a metallocene-produced LLDPE copolymer of ethylene and at least one $C_3$ to $C_{12}$ alpha olefin and having a density of from 0.916 to 0.925 g/cm$^3$ and a melt index of from 0.5 to 10 g/10 min. In one embodiment, the B layer is formed of a blend comprising a gas-phase metallocene-produced VLDPE having a melt index having the lower limits of 0.5 g/10 min or more, 0.7 g/10 min or more, 1 g/10 min or more and having the upper limits of 5 g/10 min or less, 3 g/10 min or less, or 2 g/10 min or less, with melt index ranges from any lower limit to any upper limit being within the scope of the invention. In one preferred embodiment, the B layer is formed of a blend as described herein, wherein the VLDPE component of the blend has one or more of the following characteristics, in addition to the density, melt index, and other parameters described herein:

(a) a composition distribution CDBI of 50 to 85%, alternatively 60 to 80%, or 55 to 75%, or 55% or more to 70% or less;

(b) a molecular weight distribution Mw/Mn of 2 to 3, alternatively 2.2 to 2.8;

(c) a molecular weight distribution Mz/Mw of less than 2; and (d) the presence of two peaks in a TREF measurement.

As noted above, when the multilayer film has two or more B layers, the B layers can be the same, or can differ in thickness, chemical composition, density, melt index, CDBI, MWD, or other properties, within the range of parameters consistent with the inventive polymer blends.

The thickness of each layer of the film, and of the overall film, is not particularly limited, but is determined according to the desired properties of the film. Typical film layers have a thickness of about 1 to 1000 μm, more typically about 5 to 100 μm, and typical films have an overall thickness of 10 to 100 μm.

In one embodiment, the present invention provides a single-layer (monolayer) film formed of any of the VLDPE/LLDPE polymer blends of the invention; i.e., a film having a single layer which is a B layer as described above.

In other embodiments, and using the nomenclature described above, the present invention provides multilayer films with any of the following exemplary structures:

(a) two-layer films, such as A/B and B/B';

(b) three-layer films, such as A/B/A', A/A'/B, B/A/B' and B/B'/B";

(c) four-layer films, such as A/A'/A"/B, A/A'/B/A", A/A'B/B', A/B/A'B', A/B/B'A', B/A/A'/B', A/B/B'/B", B/A/B'/B", and B/B'/B"/B''';

(d) five-layer films, such as A/A'/A"/A'''/B, A/A'/A"/B/A''', A/A'/B/A"/A''', A/A'/A"/B/B', A/A'/B/A"/B', A/A'/B/B'/A", A/B/A'/B'/A", A/B/A'/A"/B, B/A/A'/A"/B', A/A'/B/B'/B", A/B/A'/B'/B", A/B/B'/B"/A', B/A/A"/B'/B", B/A/B'/A'/B", B/A/B'/B"/A', A/B/B'/B"/B''', B/A/B'/B"/B''', B/B'/A/B"/B''', and B/B'/B"/B'''/B"";

and similar structures for films having six, seven, eight, nine or more layers. It should be appreciated that films having still more layers can be formed using the polymer blends of the invention, and such films are within the scope of the invention.

In any of the embodiments above, one or more A layers can be replaced with a substrate layer, such as glass, plastic, paper, metal, etc., or the entire film can be coated or laminated onto a substrate. Thus, although the discussion herein has focussed on multilayer films, the films of the polymer blends of the present invention can also be used in as coatings; e.g., films formed of the inventive polymer blends, or multilayer films including one or more layers formed of the inventive polymer blends, can be coated onto a substrate such as paper, metal, glass, plastic and other materials capable of accepting a coating. Such coated structures are also within the scope of the present invention.

As described below, the films can be extrusion cast films or blown films. The films can further be embossed, or produced or processed according to other known film processes.

The films can be tailored to specific applications by adjusting the thickness, materials and order of the various layers, as well as the additives in each layer. Films according to the invention can be used as cling films, stretch films, shipping sacks, produce bags, lamination films, liners, diaper films, or for a variety of other suitable end-use applications that will be apparent to those skilled in the art.

4.4.1 Film Properties

Film properties can be measured by techniques well known in the art, and specifically described in the Examples herein. It has been surprisingly found that films of the present invention show improved strength and puncture properties, relative to films formed of, for example, LLDPE/LLDPE blends. Specifically, in particular embodiments, the films of the present invention have dart drop values of at least 5 g/μm, preferably at least 6 g/μm, more preferably at least 8 g/μm, and still more preferably at least 9 μm/g, as determined by the procedures described in the Examples section herein. Dart impact and other film properties are explained in more detail in the Examples herein.

4.5 Producing Films and Coatings

Films may be formed by any number of well known extrusion or coextrusion techniques. Any of the blown or chill roll techniques commonly used are suitable. For example, the composition can be extruded in a molten state through a flat die and then cooled to form a film. Alternatively, the composition can be extruded in a molten state through an annular die and then blown and cooled to form a tubular, blown film, which can then be axially slit and unfolded to form a flat film. Films of the invention may be unoriented, uniaxially oriented or biaxially oriented. Physical properties of the film may vary from those of the polymer blend, depending on the film forming techniques used.

As a specific example, cast films can be prepared using a pilot scale commercial cast film line machine as follows. Pellets of the polymeric blend are melted at temperatures ranging from about 250° C. to about 300° C., with the specific melt temperature being chosen to match melt viscosities of the various resins. The melts are conveyed to a coextrusion adapter that combines the melt flows into a multilayer, coextruded structure. This layered flow is distributed through a single manifold film extrusion die to the desired width. The die gap opening is typically about 0.025 inches (about 600 μm). The material is then drawn down to the final gauge. The material draw down ratio is typically about 21:1 for 0.8 mil (20 μm) films. A vacuum box or air knife can be used to pin the melt exiting the die opening to a primary chill roll maintained at about 90° F. (32° C.).

As another example, blown films can be prepared as follows. The polymer composition is introduced into the feed hopper of an extruder, such as a 63.5 mm Egan extruder that is water-cooled, resistance heated, and has an L/D ratio of 24:1. The film can be produced using a 15.24 cm Sano die with a 2.24 mm die gap, along with a Sano dual orifice non-rotating, non-adjustable air ring. The film is extruded through the die into a film that was cooled by blowing air onto the surface of the film. The film is drawn from the die typically forming a cylindrical film that is cooled, collapsed and optionally subjected to a desired auxiliary process, such as slitting, treating, sealing or printing. The finished film can be wound into rolls for later processing, or can be fed into a bag machine and converted into bags. A particular blown film process and apparatus suitable for forming films according to embodiments of the present invention is described in U.S. Pat. No. 5,569,693.

Multiple-layer films may be formed by methods well known in the art. The materials forming each layer may be coextruded through a coextrusion feedblock and die assembly to yield a film with two or more layers adhered together but differing in composition. Coextrusion can be adapted to cast film or blown film processes. Multiple-layer films may also be formed by extrusion coating whereby a substrate material is contacted with the hot molten polymer as the polymer exits the die. For instance, an already formed polypropylene film may be extrusion coated with an ethylene copolymer film as the latter is extruded through the die. Multiple-layer films may also be formed by combining two or more single layer films prepared as described above. The total thickness of multilayer films may vary based upon the application desired. A total film thickness of about 5–100

µm, more typically about 10–50 µm, is suitable for most applications. Those skilled in the art will appreciate that the thickness of individual layers for multilayer films may be adjusted based on desired end use performance, resin or copolymer employed, equipment capability and other factors.

Yet, another aspect of the invention relates to an article formed by extrusion coating. For example, a substrate material can be contacted with the hot molten polymer as the polymer exits the die. For instance, an already formed polypropylene film may be extrusion coated with an ethylene copolymer film as the latter is extruded through the die. Extrusion coatings are generally processed at higher temperatures than cast films, typically about 600° F., in order to promote adhesion of the extruded material to the substrate. Other extrusion coating processes are known in the art, including those described, for example, in U.S. Pat. Nos. 5,268,230, 5,178,960 and 5,387,630. In one embodiment, the present invention is directed to a VLDPE/LLDPE film or coating on a flexible substrate such as paper, metal foil or the like, wherein the film or coating is formed of a VLDPE/LLDPE polymer blend. The coating may be a monolayer film or a multi-layer film. The substrate can also be stock for milk cartons, juice containers, films, etc. In one embodiment, the coating is formed of a blend comprising a gas-phase metallocene-produced VLDPE, the VLDPE having a melt index having the lower limits of 5 g/10 min or more, 7 g/10 min or more, 9 g/10 min or more, 13 g/10 min or more, 14 g/10 min or more, 15 g/10 min and having the upper limit of 20 g/10 min or less, with melt index ranges from any lower limit to the upper limit being within the scope of the invention.

The films and coatings of the present invention are also suitable for use in laminate structures; i.e., with a film or a coating as described herein disposed between two substrates. These films and coatings are also suitable 4.6 Applications There are many potential applications of films produced from the polymer blends described herein. These films can be made into other forms, such as tape, by any one of a number of well known cutting, slitting, and/or rewinding techniques. They may be useful as stretch, sealing, or oriented films.

Typical applications include:

packaging, such as bundling, packaging and unitizing a variety of products including various foodstuffs, rolls of carpet, liquid containers and various like goods normally containerized and/or palletized for shipping, storage, and/or display;

flexible food packaging, including frozen food packaging;

bags, such as trash bags and liners, industrial liners, shipping sacks and produce bags; and surface protection applications, with or without stretching, such as in the temporary protection of surfaces during manufacturing, transportation, etc.

Surfaces of the films of this invention can be modified by known and conventional post-forming techniques such as corona discharge, chemical treatment, flame treatment, and the like.

5. EXAMPLES

Materials and Methods

Metallocene catalysts for the polymerization of the inventive VLDPE were prepared according to the methods as described above for an unbridged bis-Cp structure (such as a bis(1,3-methyl-n-butyl cyclopentadienyl)zirconium dichloride).

Cast films were prepared using a pilot scale commercial cast film line machine as described above. The material melt temperature was approximately 550° F. (290° C.). The die gap opening was nominally 0.025 inches (0.63 mm). An air knife was used to pin the melt exiting the die opening to a primary chill roll maintained at about 80° F. (27° C.). The films described in the following Examples were prepared as three-layer A/B/A films or A/A'/A films (comparative), with relative thicknesses in the ratio 15:70:15 for the three layers A:B:A. For simplicity, the outer "A" layers are labeled without prime symbols as these layers are the same in the following examples. The composition of the "A" and "B" layers is defined below.

Tensile strength values (tensile yield, ultimate tensile strength, elongation at break and elongation at yield) were measured (machine direction ("MD") and transverse direction ("TD")) in accordance with ASTM D882-97. The film gauge was measured using ASTM D5947-96 Method C, except that the micrometer calibration was performed annually with a commercially available gauge block (Starret Webber 9, JCV1&2).

The ACD protocol is an analytical-scale TREF (Temperature Rising Elution Fractionation) test for semi-crystalline copolymers to characterize the composition distribution (CD). A sample is dissolved in a good solvent, cooled slowly to allow crystallization on a support, and then re-dissolved and washed from the support by heating during elution. Polymer chains are fractionated by differences in their crystallization temperature in solution, which is a function of composition (and defect structure). A mass detector provides concentration vs. elution temperature data; CD characterization is obtained by applying a calibration curve (i.e., mole % comonomer vs. temperature) established using narrow-CD standards. Two in-house Visual Basic programs are used for data acquisition and analysis.

There are really two distributions provided by the ACD test:

Solubility Distribution (weight fraction vs. solubility temperature)—measured directly.

Composition Distribution (weight fraction vs. comonomer content)—obtained by applying the calibration curve to the solubility distribution.

Emphasis is usually placed on characterization of the CD. However, the solubility distribution can be of equal or greater importance when:

A calibration curve has not been established for the polymer of interest.

The MW of the sample is low, or the MWD is broad enough that a significant portion of the sample is low MW (M<20 k). Under these circumstances, the reported CD is influenced by the MW-dependence of solubility. The calibration curve must be corrected for the effect of MW to give the true CD, which requires a priori knowledge of the relative influence of MW and composition on solubility for a given sample. In contrast, the solubility distribution correctly accounts for contributions from both effects, without trying to separate them.

Note that the solubility distribution should depend on solvent type and crystallization/dissolution conditions. If correctly calibrated, the CD should be independent of changes in these experimental parameters.

Composition Distribution Breadth Index (CDBI) was measured using the following instrumentation: ACD: Modified Waters 150-C for TREF (Temperature Rising Elution Fractionation) analysis (includes crystallization column, by-pass plumbing, timing and temperature controllers); Column: 75 micron glass bead packing in (High Pressure Liquid Chromatography) HPLC-type column; Coolant: Liquid Nitrogen; Software: "A-TREF" Visual Basic programs; and Detector: Polymer Laboratories ELS-1000. Run conditions for the CDBI measurements were as follows:

GPC settings

| | |
|---|---|
| Mobile phase: | TCE (tetrachlororethylene) |
| Temperature: | column compartment cycles 5–115° C., injector compartment at 115° C. |
| Run time: | 1 hr 30 min |
| Equilibration time: | 10 min (before each run) |
| Flow rate: | 2.5 mL/min |
| Injection volume: | 300 μL |
| Pressure settings: | transducer adjusted to 0 when no flow, high pressure cut-off set to 30 bar |

Temperature controller settings.

Initial Temperature: 115° C.

Ramp 1 Temperature: 5° C. Ramp time=45 min Dwell time=3 min

Ramp 2 Temperature: 115° C. Ramp time=30 min Dwell time=0 min

Alternative temperature controller settings if two peaks are not exhibited in a TREF measurement.

Initial Temperature: 115° C.

Ramp 1 Temperature: 5° C. Ramp time=12 hrs Dwell time=3 min

Ramp 2 Temperature: 115° C. Ramp time=12 hrs Dwell time=0 min

In some case, longer ramp times may be needed to show two peaks in a TREF measurement.

ELS settings

| | |
|---|---|
| Nebulizer temperature: | 120° C. |
| Evaporator temperature: | 135° C. |
| Gas flow rate: | 1.0 slm (standard liters per minute) |
| Heated transfer line temperature: | 120° C. |

Melt Index was determined according to ASTM D-1238-95. Melt index is reported in units of g/10 min, or the numerically equivalent units of dg/min.

Density (g/cm$^3$) was determined using chips cut from plaques compression molded in accordance with ASTM D-1928-96 Procedure C, aged in accordance with ASTM D618 Procedure A, and measured according to ASTM D1505-96.

Elmendorf tear was determined in accordance with ASTM D1922-94a. The film gauge was measured according to ASTM D374-94 Method C, except that the micrometer calibration was performed annually with a commercially available gauge block (Starret Webber 9, JCV1&2).

1% Secant (both MD and TD) was determined in accordance with ASTM D882-97. The film gauge was measured according to ASTM D5947-96 Method C, except that the micrometer calibration was performed annually with a commercially available gauge block (Starret Webber 9, JCV1&2).

Dart Drop values were measured in accordance with ASTM D1709-98 Method A. The film gauge was measured according to ASTM D374-94 Method C, except that the micrometer calibration was performed annually with a commercially available gauge block (Starret Webber 9, JCV1&2).

The probe puncture energy test was conducted using an Instron Universal tester that records a continuous reading of the force (stress) and penetration (strain) curve. A 6 inch by 6 inch (15 cm by 15 cm) film specimen was securely mounted to a compression load cell to expose a test area 4 inches (10 cm) in diameter. Two HDPE slip sheets each 2 in by 2 in (5 cm×5 cm) and each approximately 0.25 mil (6.35 μm) thick were loosely placed on the test surface. A ¾ in (1.9 cm) diameter elongated matte finished stainless steel probe, traveling at a constant speed of 10 in/min (25 cm/min) was lowered into the film, and a stress/strain curve was recorded and plotted. The "puncture force" was the maximum force (lb or N) encountered. The machine was used to integrate the area under the stress/strain curve, which is indicative of the energy consumed during the penetration to rupture testing of the film, and is reported as "puncture energy" or "break energy" (in○lb or J). The probe penetration distance was not recorded in this test.

Haze (%) was determined according to ASTM D1003-97 using the alternate Haze Shortcut Procedure.

Gloss (unitless, sometimes reported as "GU") at 45 degrees was determined according to ASTM D2457-97.

Gauge: film gauge was measured according to ASTM D374-94 Method C, except that the micrometer calibration was performed annually with a commercially available gauge block (Starret Webber 9, JCV1&2).

Shrink (%) was determined in the machine direction (MD) and transverse direction (TD) as follows. A 100 mm circle is cut from the film. The machine direction is marked, then the specimen is talced and then heated. The amount of shrinkage is measured in both MD and TD, and is reported as % MD shrinkage and % TD shrinkage.

For measurements of film properties, the film samples were annealed by heating for 48 hours at 140° F. (60° C.) prior to testing.

In the following Examples, resins produced by various suppliers were used to demonstrate the unique and advantageous properties of the polymer blend compositions and films of the present invention. It should be understood that the specific numerical values of various parameters of these resins described below are nominal values.

EXACT® 3132 is a plastomer made using metallocene catalyst in a high pressure bulk polymerization process having a nominal density of 0.9031 g/cm$^3$, available from ExxonMobil Chemical Co., Houston, Tex.

EXCEED™ ECD-147 is gas-phase metallocene-produced LLDPE ethylene/hexene copolymer with a Melt Index of 3.5 dg/min, a density of 0.921 g/cm$^3$, a melting point of 120° C., a CDBI of approximately 60–80%, an MWD (Mw/Mn) of approximately 2.5–2.6, and a Melt Flow Rate ($I_{21}/I_2$) of approximately 16–18, available from ExxonMobil Chemical Co., Houston, Tex.

EXCEED™ ECD-320 is a gas-phase metallocene produced LLDPE ethylene/hexene copolymer with a Melt Index of 1.0 dg/min and a density of 0.916 g/cm$^3$, available from ExxonMobil Chemical Co., Houston, Tex.

EXCEED™ ECD-321 is a gas-phase metallocene produced VLDPE ethylene/hexene copolymer with a Melt Index of 1.0 dg/min and a density of 0.912 g/cm$^3$, a melting point of 116.5° C., a CDBI of approximately 60–80%, an MWD (Mw/Mn) of approximately 2.5–2.6, and a Melt Flow Rate ($I_{21}/I_2$) of approximately 16–18, available from ExxonMobil Chemical Co., Houston, Tex.

EXCEED™ 350D60 is a linear low density polyethylene made using metallocene catalyst in a gas phase polymerization process having a nominal density of 0.918 g/cm³, available from ExxonMobil Chemical Co., Houston, Tex.

EXCEED™ 357C32 is a gas-phase metallocene produced m-LLDPE ethylene/hexene copolymer with a Melt Index of 3.5 dg/min, a density of 0.917 g/cm³, and a melting point of 115° C., available from ExxonMobil Chemical Co., Houston, Tex.

ExxonMobil LL-1001 is a gas-phase Ziegler-Natta produced LLDPE ethylene/butene copolymer blown film resin having a Melt Index of 1.0 dg/min, a density of 0.918 g/cm³, and a melting point of 121° C., available from ExxonMobil Chemical Co., Houston, Tex.

ExxonMobil LL-1002 is a Ziegler-Natta LLDPE ethylene/butene copolymer blown film resin having a Melt Index of 2.0 dg/min, a density of 0.918 g/cm³, and a melting point of 121° C., available from ExxonMobil Chemical Co., Houston, Tex.

LL-3003 is a Ziegler-Natta LLDPE ethylene/hexene copolymer cast film resin having a Melt Index of 3.2 dg/min, a density of 0.9175 g/cm³, a CDBI of approximately 35%, a melting point of 124° C., and a Melt Flow Rate ($I_{21}/I_2$) of approximately 27–30, available from ExxonMobil Chemical Co., Houston, Tex.

ExxonMobil LL-3001 is a linear low density polyethylene made using Ziegler-Natta catalyst in a gas phase polymerization process having a nominal density of 0.917 g/cm³ and a nominal melt index of 1 dg/min, available from ExxonMobil Chemical Co., Houston, Tex.

Dow Affinity 1840 is very low density polyethylene made using metallocene catalyst in a solution polymerization process having a nominal density of 0.9104 g/cm³, available from Dow Chemical Co.

Dow Attane 4201 is a very low density polyethylene made using Ziegler-Natta catalyst in a solution polymerization process having a nominal density of 0.9132 g/cm³, available from Dow Chemical Co.

In the data tables following, the names of several commercial EXCEED™ resins are abbreviated. Each occurrence of the abbreviated name should be interpreted as identifying a particular EXCEED™ resin. EXCEED™ and EXACT® are trademarks of ExxonMobil Chemical Co., Houston, Tex.

Example 1A

Certain VLDPE polymer resins of the inventions herein were prepared using gas phase polymerization using metallocene catalyst systems as disclosed elsewhere herein. The invention resins are identified below in Table I as Samples A, G, H (EXCEED™ 321, 0.9129 g/cm³), and I. The co-monomers used to make Samples A, G, H, and I were ethylene and hexene. Fluidized gas phase reactors were operated to produce the resulting copolymers.

The polymerizations were conducted in the continuous gas phase fluidized bed reactors. The fluidized beds of those reactors were made up of polymer granules. The gaseous feed streams of ethylene and hydrogen were introduced below each reactor bed into the recycle gas line. Hexene comonomer was introduced below the reactor bed. An inert hydrocarbon (isopentane) was also introduced to each reactor in the recycle gas line, to provide additional heat capacity to the reactor recycle gases. The individual flow rates of ethylene, hydrogen and hexene comonomer were controlled to maintain fixed composition targets. The concentration of the gases were measured by an on-line gas chromatograph to ensure relatively constant composition in the recycle gas stream.

The solid catalyst was injected directly into the fluidized beds using purified nitrogen. The catalyst rates were adjusted to maintain constant production rate. The reacting beds of growing polymer particles were maintained in a fluidized state by a continuous flow of the make up feed and recycle gas through each reaction zone. To maintain constant reactor temperatures, the temperature of the recycle gas was continuously adjusted up or down to accommodate any changes in the rate of heat generation due to the polymerization.

The fluidized bed was maintained at a constant height by withdrawing a portion of the bed at a rate equal to the formation of the particulate product. The product was transferred to a purger vessel to remove entrained hydrocarbons.

Specifically, the properties of certain "invention" polymers, i.e., those made in accordance with the gas polymerization processes corresponding to the invention, using metallocene catalysts, were compared with certain "comparative" polymers, i.e., polymers made in accordance with non-invention methods.

Referring now to the comparative examples, Sample B was made using a comparative polymer, specifically, a linear low density polyethylene (EXCEED™ 350D60, 0.9189 g/cm³) made using metallocene catalyst in a gas phase polymerization process. Sample C was made using a linear low density polyethylene (ExxonMobil LL-3001, 0.9199 g/cm³) made using Ziegler-Natta catalyst in a gas phase polymerization process. Sample D was made using a plastomer (EXACT® 3132, 0.9031 g/cm³) made using metallocene catalyst in a high pressure bulk polymerization process. Sample E was made using a very low density polyethylene (Dow Attane 4201, 0.9132 g/cm³) made using Ziegler-Natta catalyst in a solution polymerization process. Sample F was made using a very low density polyethylene (Dow Affinity 1840, 0.9104 g/cm³) made using metallocene catalyst in a solution polymerization process. Sample J was made using a linear low density polyethylene (EXCEED™ ECD-320, 0.9178 g/cm³) made using metallocene catalyst in a gas phase polymerization process. Sample K was made using a linear low density polyethylene (EXCEED™ 350D60, 0.9183 g/cm³) made using metallocene catalyst in a gas phase polymerization process.

The resin densities, melt index test results, and characterization data are set forth in Table 1 below. Comparative examples of samplesn B–F and J–K are denoted in the table by an asterisk (*).

TABLE 1

| | A | B* | C* | D* | E* | F* | G | H | I | J* | K* |
|---|---|---|---|---|---|---|---|---|---|---|---|
| Resin | m-VLDPE | m-LLDPE (EXCEED 350D60) | ZN-LLDPE (LL-3001) | m-Plastomer (EXACT 3132) | ZN-VLDPE (Attane 4201) | m-VLDPE (Affinity 1840) | m-VLDPE | m-VLDPE (ECD-321) | m-VLDPE | m-LLDPE (ECD-320) | m-LLDPE (EXCEED 350D60) |

TABLE 1-continued

| | \multicolumn{11}{c|}{Resin Properties} | | | | | | | | | | |
| | A | B* | C* | D* | E* | F* | G | H | I | J* | K* |
|---|---|---|---|---|---|---|---|---|---|---|---|
| Density (g/cm³) | | | | | | | | | | | |
| Molded | 0.9129 | 0.9189 | 0.9199 | 0.9031 | 0.9132 | 0.9104 | 0.9114 | 0.9129 | 0.9130 | 0.9178 | 0.9183 |
| Rheology | | | | | | | | | | | |
| MI (I2) | 1.07 | 1.17 | 1.10 | 1.09 | 1.00 | 0.96 | 0.97 | 1.17 | 1.07 | 1.14 | 1.12 |
| HLMI (I21) | 18.50 | 19.14 | 30.03 | 18.03 | 30.37 | 35.54 | 17.04 | 18.18 | 17.39 | 18.13 | 17.41 |
| Ratio (I21/I2) | 17.29 | 16.36 | 27.30 | 16.54 | 30.37 | 37.02 | 17.56 | 15.5 | 16.3 | 15.9 | 15.6 |
| MI Swell | 1.12 | 1.08 | 1.17 | 1.01 | 1.14 | 1.23 | 1.10 | 1.13 | 1.13 | 1.12 | 1.13 |
| Hexene Content | | | | | | | | | | | |
| Wt % | 9.6 | 7.1 | | | | | 10.2 | 10.4 | 10.0 | 8.2 | 7.2 |
| GPC-HT | | | | | | | | | | | |
| Mn | 50612 | 48653 | | | | | 52016 | 45411 | 44528 | 44050 | 46928 |
| Mw | 100908 | 100064 | | | | | 102647 | 101795 | 103827 | 103123 | 103842 |
| Mw/Mn | 1.99 | 2.06 | | | | | 1.97 | 2.24 | 2.33 | 2.34 | 2.21 |
| Mz/Mw | 1.66 | 1.69 | | | | | 1.61 | 1.73 | 1.75 | 1.74 | 1.73 |
| Mz + 1/Mw | 2.46 | 2.52 | | | | | 2.29 | 2.66 | 2.71 | 2.65 | 2.66 |
| ACD | | | | | | | | | | | |
| CDBI | 64.5 | 6.7 | | | | | 55.3 | 71.8 | 66.4 | 62.5 | 72.7 |
| % Solubles | 0.6 | 0.6 | | | | | 1.1 | 1.2 | 1.2 | 1.7 | 2.3 |
| DSC (Celsius) | | | | | | | | | | | |
| 2nd melt-Peak | 118.34 | 120.70 | 124.56 | | 118.00 | 105.68 | 117.83 | 116.50 | 116.07 | 119.37 | 118.03 |
| 2nd peak | 103.41 | 109.62 | | 99.64 | 123.25 | | 101.72 | 100.81 | 100.43 | 106.36 | 107.76 |
| 3rd peak | | | | | 103.62 | | | | | | |
| Delta H (J/g) | 112.06 | 126.96 | 128.45 | 94.76 | 112.45 | 108.61 | 109.84 | 113.44 | 122.44 | 131.67 | 132.32 |
| Crystallization-Peak | | | | | | | | 102.37 | 102.76 | 105.33 | 103.27 |
| 2nd peak | | | | | | | | 89.42 | 89.96 | 94.87 | 94.51 |
| 3rd peak | | | | | | | | 60.58 | 61.33 | 64.74 | 66.16 |
| Delta H (J/g) | −118.11 | −129.63 | −130.28 | −96.17 | −114.28 | −114.41 | −112.19 | −121.36 | −122.46 | −132.01 | −130.65 |

The following Examples 1–15 show the properties of three-layer films formed from conventional materials (comparative) and from polymer blends according to the present invention. Each film was of the three-layer A/A'/A (comparative) or A/B/A structure, with the outer A layers being the same in all examples, and the three layers in a thickness ratio of 15/70/15. The A layers were formed of LL3003, a Ziegler-Natta LLDPE ethylene/hexene copolymer cast film resin. The materials and methods are as described above.

Examples 1–3 (Comparative)

Conventional A/A'/A three-layer films were formed for comparison to the inventive films. The inner layer (A') was formed of an mLLDPE resin having a nominal density of 0.917 g/cm³ (EXCEED™ 357C32, Example 1) or an mLLDPE resin having a nominal density of 0.921 g/cm³ (EXCEED™ 147, Examples 2 and 3). Table 2 shows the film properties.

TABLE 2

| | Example 1 (Comparative) | Example 2 (Comparative) | Example 3 (Comparative) |
|---|---|---|---|
| Outer Layer Composition | ZN-LLDPE (LL3003) | ZN-LLDPE (LL3003) | ZN-LLDPE (LL3003) |
| Inner Layer Composition | 100% m-LLDPE (ECD357C32) | 100% m-LLDPE (ECD147) | 100% m-LLDPE (ECD147) |
| Inner Layer Resin Density, g/cm³ | 0.917 | 0.921 | 0.921 |
| Inner Layer Resin MI, g/10 min | 3.5 | 3.5 | 3.5 |
| Tensile Strength @ Yield | | | |
| MD, psi (MPa) | 1164 (8.03) | 1226 (8.45) | 1207 (8.32) |
| TD, psi (MPa) | 1217 (8.39) | 1214 (8.37) | 1087 (7.49) |
| at 200% MD, psi (MPa) | 1931 (13.3) | 1889 (13.0) | 2171 (15.0) |
| Ultimate Tensile | | | |
| MD, psi (MPa) | 9873 (68.1) | 9029 (62.3) | 9622 (66.3) |
| TD, psi (MPa) | 7384 (50.9) | 6672 (46.0) | 6362 (43.9) |
| Elongation @ Yield | | | |
| MD, % | 8.0 | 8.2 | 8.7 |
| TD, % | 10.4 | 7.9 | 6.7 |
| Break Elongation | | | |
| MD, % | 547 | 549 | 455 |
| TD, % | 758 | 796 | 726 |
| 1% Secant | | | |
| MD, psi (MPa) | 16682 (115) | 18010 (124) | 15971 (110) |
| TD, psi (MPa) | 19112 (132) | 21142 (146) | 18864 (130) |

TABLE 2-continued

|  | Example 1 (Comparative) | Example 2 (Comparative) | Example 3 (Comparative) |
|---|---|---|---|
| Elmendorf Tear | | | |
| MD, g | 234 | 204 | 95 |
| TD, g | 655 | 649 | 550 |
| MD, g/mil (g/μm) | 252 (9.93) | 215 (8.46) | 119 (4.69) |
| TD, g/mil (g/μm) | 699 (27.5) | 710 (28.0) | 688 (27.1) |
| Dart Drop | | | |
| g | 149 | 117 | 91 |
| g/mil (g/μm) | 159 (6.26) | 127 (5.00) | 114 (4.49) |
| Average Gauge, mil (μm) | 0.94 (24) | 0.92 (23) | 0.80 (20) |
| Haze, % | 1.8 | 1.8 | 1.6 |
| Gloss @ 45 degrees | 89 | 89 | 90.7 |
| Puncture | | | |
| Peak Force, lb (N) | 9.62 (42.8) | 9.48 (42.2) | 8.79 (39.1) |
| Peak Force, lb/mil (N/μm) | 10.23 (1.79) | 10.3 (1.80) | 10.99 (1.92) |
| Break Energy, in · lb (J) | 33.55 (3.79) | 33.3 (3.76) | 27.83 (3.14) |
| Break Energy, in · lb/mil (mJ/μm) | 35.69 (159) | 36.2 (161) | 34.79 (155) |
| Shrink: MD, % | 24 | 26 | 44 |
| TD, % | 1 | 0 | 1 |
| Film Density, g/cm³ | 0.9127 | 0.9141 | |

Examples 4–5

Three-layer films were as in Example 1–3, using either conventional polymer blends (comparative) or polymer blends of the invention, for the inner layer. In Example 4, the inner layer was a blend of 10% by weight m-VLDPE (EXCEED™ 321, density 0.912 g/cm³) and 90% by weight m-LLDPE (EXCEED™ 147, density 0.921 g/cm³) Example 5 is a comparative example. The inner layer was a blend of 10% by weight m-LLDPE (EXCEED™ 320, density 0.916 g/cm³) and 90% by weight a second m-LLDPE EXCEED™ 147. Thus, Examples 4 and 5 differ only in that the polymer blend forming the inner layer was an m-VLDPE/m-LLDPE blend in Example 4 (inventive), and an m-LLDPE/m-LLDPE blend in Example 5 (comparative). Table 3 shows the data. For further comparison, the data averaging Example 2 and 3, wherein the inner layer was 100% m-LLDPE (EXCEED™ 147) is also shown.

TABLE 3

|  | Example 4 | Example 5 (Comparative) | Examples 2–3 (Comparative) |
|---|---|---|---|
| Outer Layer Composition | ZN-LLDPE (LL3003) | ZN-LLDPE (LL3003) | ZN-LLDPE (LL3003) |
| Inner Layer Composition | 10% m-VLDPE (ECD321) 90% m-LLDPE (ECD147) | 10% m-LLDPE (ECD320) 90% m-LLDPE (ECD147) | 100% m-LLDPE (ECD147) |
| Inner Layer Resin Density, g/cm³ | 10% 0.912 90% 0.921 | 10% 0.916 90% 0.921 | 0.921 g/cm³ |

TABLE 3-continued

|  | Example 4 | Example 5 (Comparative) | Examples 2–3 (Comparative) |
|---|---|---|---|
| Inner Layer Resin MI, g/10 min | 10% 1.0 90% 3.5 | 10% 1.0 90% 3.5 | 100% 3.5 |
| Tensile Strength @ Yield | | | |
| MD, psi (MPa) | 1220 (8.41) | 1142 (7.87) | 1216 (8.39) |
| TD, psi (MPa) | 1186 (8.18) | 1124 (7.75) | 1150 (7.93) |
| at 200% MD, psi (MPa) | 1924 (13.3) | 1982 (13.7) | 2030 (14.0) |
| Ultimate Tensile | | | |
| MD, psi (MPa) | 9344 (64.4) | 9659 (66.6) | 9325 (64.3) |
| TD, psi (MPa) | 7028 (48.5) | 6280 (43.3) | 6517 (44.9) |
| Elongation @ Yield | | | |
| MD, % | 8.4 | 8.7 | 8.4 |
| TD, % | 7.4 | 8.3 | 7.3 |
| Break Elongation | | | |
| MD, % | 522 | 475 | 502 |
| TD, % | 775 | 696 | 761 |
| 1% Secant | | | |
| MD, psi (MPa) | 19395 (134) | 16924 (117) | 16990 (117) |
| TD, psi (MPa) | 20599 (142) | 19165 (132) | 20003 (138) |
| Elmendorf Tear | | | |
| MD, g | 218 | 115 | 149 |
| TD, g | 651 | 511 | 599 |
| MD, g/mil (g/μm) | 234 (9.2) | 139 (5.5) | 167 (6.6) |
| TD, g/mil (g/μm) | 693 (27.3) | 616 (24.3) | 699 (27.5) |
| Dart Drop: g | 126 | 98 | 104 |
| g/mil (g/μm) | 137 (5.39) | 120 (4.72) | 120 (4.74) |
| Average Gauge, mil (μm) | 0.92 (23) | 0.82 (21) | 0.86 (22) |
| Haze (%) | 1.7 | 1.6 | 1.7 |
| Gloss @ 45 degrees | 90 | 91.8 | 89.8 |
| Puncture | | | |
| Peak Force, lb (N) | 9.49 (42.2) | 9.17 (40.8) | 9.13 (40.6) |
| Peak Force, lb/mil (N/μm) | 10.31 (1.81) | 11.18 (1.96) | 10.64 (1.86) |
| Break Energy, in · lb (J) | 32.32 (3.65) | 31.34 (3.54) | 30.56 (3.45) |
| Break Energy, in · lb/mil (mJ/μm) | 35.13 (156) | 38.22 (170) | 35.49 (158) |
| Shrink | | | |
| MD, % | 29 | 43 | 35 |
| TD, % | −4 | −1 | 0.5 |
| Film Density, g/cm³ | 0.9143 | | |

Examples 6–9

Three-layer films were made as in Examples 1–3, using either conventional polymer blends (comparative) or polymer blends of the invention, for the inner layer. In Example 6, the inner layer was a blend of 20% by weight m-VLDPE (EXCEED™ 321, density 0.912 g/cm³) and 80% by weight m-LLDPE (EXCEED™ 147, density 0.921 g/cm³).

Examples 7–9 are comparative examples. In Examples 7–9, the inner layer was a blend of: (a) 20% by weight m-LLDPE (EXCEED™ 320, density 0.916 g/cm³) and 80% by weight of a second m-LLDPE (EXCEED™ 147, density 0.921 g/cm³), in Example 7; (b) 20% by weight of a Ziegler-Natta LLDPE (LL1001, density 0.918 g/cm³) and 80% by weight of an m-LLDPE (EXCEED™ 147, density 0.921 g/cm³), in Example 8; and (c) 20% by weight of a Ziegler-Natta LLDPE (LL1002, density 0.918 g/cm³) and 80% by weight of an m-LLDPE (EXCEED™ 147, density 0.917 g/cm³), in Example 9; Example 8 and 9 differ in the Melt Index of the ZN-LLDPE; LL1001 in Example 8 has Melt Index of 1.0 dg/min, and LL1002 in Example 9 has a Melt Index of 2.0 dg/min. Table 4 shows the data.

TABLE 4

|  | Example 6 | Example 7 (Comparative) | Example 8 (Comparative) | Example 9 (Comparative) |
| --- | --- | --- | --- | --- |
| Outer Layer Composition | ZN-LLDPE (LL3003) | ZN-LLDPE (LL3003) | ZN-LLDPE (LL3003) | ZN-LLDPE (LL3003) |
| Inner Layer Composition | 20% m-VLDPE (ECD321) 80% m-LLDPE (ECD147) | 20% m-LLDPE (ECD320) 80% m-LLDPE (ECD147) | 20% ZN-LLDPE (LL1001) 80% m-LLDPE (ECD147) | 20% ZN-LLDPE (LL1002) 80% m-LLDPE (ECD147) |
| Inner Layer Resin Density, g/cm³ | 20% 0.912 80% 0.921 | 20% 0.916 80% 0.921 | 20% 0.918 80% 0.921 | 20% 0.918 80% 0.917 |
| Inner Layer Resin MI, g/10 min | 20% 1.0 80% 3.5 | 20% 1.0 80% 3.5 | 20% 1.0 80% 3.5 | 20% 2.0 80% 3.5 |
| Tensile Strength @ Yield |  |  |  |  |
| MD, psi (MPa) | 1134 (7.82) | 1181 (8.14) | 1274 (8.78) | 1230 (8.48) |
| TD, psi (MPa) | 1205 (8.31) | 1128 (7.78) | 1302 (8.98) | 1242 (8.56) |
| at 200% MD, psi (MPa) | 1933 (13.3) | 2020 (13.9) | 1937 (13.4) | 1845 (12.7) |
| Ultimate Tensile |  |  |  |  |
| MD, psi (MPa) | 9660 (66.6) | 9914 (68.3) | 8920 (61.5) | 8484 (58.5) |
| TD, psi (MPa) | 6790 (46.8) | 6725 (46.4) | 5870 (40.5) | 5663 (39.0) |
| Elongation @ Yield |  |  |  |  |
| MD, % | 7.5 | 9.5 | 8.8 | 8.5 |
| TD, % | 9.1 | 7.5 | 9.7 | 8.5 |
| Break Elongation |  |  |  |  |
| MD, % | 521 | 466 | 535 | 568 |
| TD, % | 746 | 705 | 867 | 838 |
| 1% Secant |  |  |  |  |
| MD, psi (MPa) | 17687 (122) | 15163 (105) | 16815 (116) | 17889 (123) |
| TD, psi (MPa) | 20089 (139) | 18131 (125) | 18487 (127) | 21207 (146) |
| Elmendorf Tear |  |  |  |  |
| MD, g | 246 | 131 | 163 | 117 |
| TD, g | 681 | 494 | 683 | 620 |
| MD, g/mil (g/μm) | 268 (10.6) | 154 (6.06) | 171 (6.73) | 127 (5.00) |
| TD, g/mil (g/μm) | 724 (28.5) | 588 (23.1) | 712 (28.0) | 660 (26.0) |
| Dart Drop |  |  |  |  |
| g | 149 | 113 | 95 | 88 |
| g/mil (g/μm) | 164 (6.46) | 133 (5.24) | 102 (4.02) | 95 (3.74) |
| Gauge, mil (μm) |  |  |  |  |
| Average | 0.91 (23) | 0.85 (22) | 0.93 (24) | 0.93 (24) |
| Low | 0.87 (22) | 0.81 (21) | 0.91 (23) | 0.91 (23) |
| High | 0.94 (24) | 0.89 (23) | 0.94 (24) | 0.94 (24) |
| Haze (%) | 1.7 | 1.6 | 1.5 | 1.6 |
| Gloss 45 degrees | 88 | 91.3 | 90 | 91 |
| Puncture |  |  |  |  |
| Peak Force, lb (N) | 9.77 (43.5) | 9.49 (42.2) | 9.17 (40.8) | 8.55 (38.0) |
| Peak Force, lb/mil (N/μm) | 10.74 (1.88) | 11.17 (1.96) | 9.86 (1.73) | 9.19 (1.61) |
| Break Energy, in · lb (J) | 32.25 (3.64) | 29.68 (3.35) | 31.60 (3.57) | 27.68 (3.13) |
| Break Energy, in · lb/mil (mJ/μm) | 35.44 (158) | 34.92 (155) | 33.98 (151) | 29.76 (132) |
| Shrink |  |  |  |  |
| MD, % | 30 | 46 | 39 | 38 |
| TD, % | −3 | −1 | −8 | −5 |
| Film Density, g/cm³ | 0.9135 |  | 0.9154 | 0.9144 |

Table 4 illustrates some surprising features of the films of the present invention. The inventive sample (Example 6) having an inner layer of a m-VLDPE/m-LLDPE blend shows increased dart drop values compared to films having an inner layer of an m-LLDPE/m-LLDPE blend (Example 7) or ZN-LLDPE/m-LLDPE blends (Examples 8 and 9). Additionally, Example 6 shows better puncture resistance, as shown by the higher values for peak force (N) and break energy.

Examples 10–11 (Comparative)

Examples 10–11 are comparative examples. Three-layer films were made as in Examples 1–3. The inner layer was a blend of: (a) 20% by weight of a Ziegler-Natta LLDPE (LL1001, density 0.918 g/cm³) and 80% by weight of an m-LLDPE (EXCEED™ 357C32, density 0.917 g/cm³), in Example 10; and (b) 20% by weight of a Ziegler-Natta LLDPE (LL1002, density 0.918 g/cm³) and 80% by weight of an m-LLDPE (EXCEED™ 357C32, density 0.917 g/cm³), in Example 11. Examples 10 and 11 differ in the Melt Index of the ZN-LLDPE; LL1001 in Example 10 has a Melt Index of 1.0 dg/min, and LL1002 in Example 11 has a Melt Index of 2.0 dg/min. Table 5 shows the data. The data for Example 6 (inventive) are repeated for comparison.

TABLE 5

|  | Example 6 | Example 10 (Comparative) | Example 11 (Comparative) |
|---|---|---|---|
| Outer Layer Composition | ZN-LLDPE (LL3003) | ZN-LLDPE (LL3003) | ZN-LLDPE (LL3003) |
| Inner Layer Composition | 20% m-VLDPE (ECD321) 80% m-LLDPE (ECD147) | 20% ZN-LLDPE (LL1001) 80% m-LLDPE (ECD357) | 20% ZN-LLDPE (LL1002) 80% m-LLDPE (ECD357) |
| Inner Layer Resin Density, g/cm³ | 20% 0.912 80% 0.921 | 20% 0.918 80% 0.917 | 20% 0.918 80% 0.917 |
| Inner Layer Resin MI, g/10 min | 20% 1.0 80% 3.5 | 20% 1.0 80% 3.5 | 20% 2.0 80% 3.5 |
| Tensile Strength @ Yield |  |  |  |
| MD, psi (MPa) | 1134 (7.82) | 1126 (7.76) | 1154 (7.96) |
| TD, psi (MPa) | 1205 (8.31) | 1166 (8.04) | 1139 (7.85) |
| at 200% MD, psi (MPa) | 1933 (13.3) | 1825 (12.6) | 1828 (12.6) |
| Ultimate Tensile |  |  |  |
| MD, psi (MPa) | 9660 (66.6) | 8725 (60.2) | 8790 (60.6) |
| TD, psi (MPa) | 6790 (46.8) | 6145 (42.4) | 5613 (38.7) |
| Elongation @ Yield |  |  |  |
| MD, % | 7.5 | 7.9 | 8.6 |
| TD, % | 9.1 | 7.6 | 7.6 |
| Break Elongation |  |  |  |
| MD, % | 521 | 543 | 581 |
| TD, % | 746 | 845 | 822 |
| 1% Secant |  |  |  |
| MD, psi (MPa) | 17687 (122) | 18009 (124) | 17521 (121) |
| TD, psi (MPa) | 20089 (139) | 20322 (140) | 20659 (142) |
| Elmendorf Tear |  |  |  |
| MD, g | 246 | 204 | 106 |
| TD, g | 681 | 690 | 650 |
| MD, g/mil (g/μm) | 268 (10.6) | 215 (8.46) | 112 (4.4) |
| TD, g/mil (g/μm) | 724 (28.5) | 726 (28.6) | 694 (27.3) |
| Dart Drop: g | 149 | 94 | 88 |
| g/mil (g/μm) | 164 (6.46) | 100 (3.94) | 97 (3.82) |
| Average Gauge, mil (μm) | 0.91 (23) | 0.94 (24) | 0.91 (23) |
| Haze (%) | 1.7 | 1.7 | 1.8 |
| Gloss 45 degrees | 88 | 89 | 90 |
| Puncture |  |  |  |
| Peak Force, lb (N) | 9.77 (43.5) | 9.53 (42.4) | 9.05 (40.3) |
| Peak Force, lb/mil (N/μm) | 10.74 (1.88) | 10.13 (1.77) | 9.95 (1.74) |
| Break Energy, in · lb (J) | 32.25 (3.64) | 30.46 (3.44) | 28.93 (3.27) |
| Break Energy, in · lb/mil (mJ/μm) | 35.44 (158) | 32.40 (144) | 31.79 (141) |
| Shrink |  |  |  |
| MD, % | 30 | 48 | 46 |
| TD, % | −3 | −11 | −10 |
| Film Density, g/cm³ | 0.9135 | 0.9141 | 0.9138 |

Comparing Example 6 with the conventional films of Examples 10 and 11, the films of the present invention show higher dart drop and puncture values than films having as an inner layer a conventional ZN-LLDPE/m-LLDPE blend.

Examples 12–13

Three-layer films were made as in Examples 1–3, using either conventional polymer blends (comparative) or polymer blends of the invention, for the inner layer. In Example 12, the inner layer was a blend of 30% by weight m-VLDPE (EXCEED™ 321, density 0.912 g/cm³) and 70% by weight m-LLDPE (EXCEED™ 147, density 0.921 g/cm³). Example 13 is a comparative example. In Example 13, the inner layer was a blend of: 30% by weight of an m-LLDPE (EXCEED™ 320, density 0.916 g/cm³) and 70% by weight of a second m-LLDPE (EXCEED™ 147, density 0.921 g/cm³). Table 6 shows the data.

TABLE 6

|  | Example 12 | Example 13 (Comparative) |
|---|---|---|
| Outer Layer Composition | ZN-LLDPE (LL3003) | ZN-LLDPE (LL3003) |
| Inner Layer Composition | 30% m-VLDPE (ECD321) 70% m-LLDPE (ECD147) | 30% m-LLDPE (ECD320) 70% m-LLDPE (ECD147) |
| Inner Layer Resin Density, g/cm³ | 30% 0.912 70% 0.921 | 30% 0.916 70% 0.921 |
| Inner Layer Resin MI, g/10 min | 30% 1.0 70% 3.5 | 30% 1.0 70% 3.5 |
| Tensile Strength @ Yield |  |  |
| MD, psi (MPa) | 1077 (7.43) | 1183 (8.16) |
| TD, psi (MPa) | 1114 (7.68) | 1132 (7.81) |
| at 200% MD, psi (MPa) | 1909 (13.2) | 2193 (15.1) |

TABLE 6-continued

|  | Example 12 | Example 13 (Comparative) |
|---|---|---|
| Ultimate Tensile |  |  |
| MD, psi (MPa) | 9926 (68.4) | 9955 (68.6) |
| TD, psi (MPa) | 6998 (48.3) | 6570 (45.3) |
| Elongation @ Yield |  |  |
| MD, % | 7.1 | 8.9 |
| TD. % | 7.2 | 8.7 |
| Break Elongation |  |  |
| MD, % | 515 | 437 |
| TD, % | 727 | 710 |
| 1% Secant |  |  |
| MD, psi (MPa) | 16870 (116) | 15772 (109) |
| TD, psi (MPa) | 20007 (138) | 18356 (127) |
| Elmendorf Tear |  |  |
| MD, g | 225 | 106 |
| TD, g | 620 | 509 |
| MD, g/mil (g/μm) | 237 (9.33) | 129 (5.08) |
| TD, g/mil (g/μm) | 646 (25.4) | 613 (24.1) |
| Dart Drop: g | 226 | 112 |
| g/mil (g/μm) | 246 (9.69) | 138 (5.43) |
| Average Gauge, mil (μm) | 0.92 (23) | 0.81 (21) |
| Haze (%) | 1.7 | 1.5 |
| Gloss 45 degrees | 87 | 91.5 |
| Puncture |  |  |
| Peak Force, lb (N) | 10.58 (47.1) | 9.41 (41.9) |
| Peak Force, lb/mil (N/μm) | 11.50 (2.01) | 11.61 (2.03) |
| Break Energy, in · lb (J) | 37.07 (4.19) | 32.07 (3.62) |
| Break Energy, in · lb/mil (mJ/μm) | 40.29 (179) | 39.60 (176) |
| Shrink |  |  |
| MD, % | 36 | 44 |
| TD, % | −6 | 0 |
| Film Density, g/cm³ | 0.9125 |  |

Comparing Example 12 with the conventional film of Example 13, the films of the present invention show higher dart drop and puncture values (peak force (N) and break energy) than films having as an inner layer a conventional ZN-LLDPE/m-LLDPE blend.

Examples 14–15

Three-layer films were made as in Examples 1–3, using either conventional polymer blends (comparative) or polymer blends of the invention, for the inner layer. In Example 14, the inner layer was a blend of 50% by weight m-VLDPE (EXCEED™ 321, density 0.912 g/cm³) and 50% by weight m-LLDPE (EXCEED™ 147, density 0.921 g/cm³). Example 15 is a comparative example. In Example 15, the inner layer was a blend of: 50% by weight of an m-LLDPE (EXCEED™ 320, density 0.916 g/cm³) and 50% by weight of a second m-LLDPE (EXCEED™ 147, density 0.921 g/cm³). Table 7 shows the data.

TABLE 7

|  | Example 14 | Example 15 (Comparative) |
|---|---|---|
| Outer Layer Composition | ZN-LLDPE (LL3003) | ZN-LLDPE (LL3003) |
| Inner Layer Composition | 50% m-VLDPE (ECD321) 50% m-LLDPE (ECD147) | 50% m-LLDPE (ECD320) 50% m-LLDPE (ECD147) |

TABLE 7-continued

|  | Example 14 | Example 15 (Comparative) |
|---|---|---|
| Inner Layer Resin Density, g/cm³ | 50% 0.912 50% 0.921 | 50% 0.916 50% 0.921 |
| Inner Layer Resin MI, g/10 min | 50% 1.0 50% 3.5 | 50% 1.0 50% 3.5 |
| Tensile Strength @ Yield |  |  |
| MD, psi (MPa) | 1069 (7.37) | 1141 (7.87) |
| TD, psi (MPa) | 1014 (6.99) | 1108 (7.64) |
| at 200% MD, psi (MPa) | 2212 (15.3) | 2188 (15.1) |
| Ultimate Tensile |  |  |
| MD, psi (MPa) | 10527 (72.6) | 10351 (71.4) |
| TD, psi (MPa) | 6972 (48.1) | 6814 (47.0) |
| Elongation @ Yield |  |  |
| MD, % | 9.7 | 9.2 |
| TD. % | 7.9 | 8.0 |
| Break Elongation |  |  |
| MD, % | 412 | 426 |
| TD, % | 660 | 679 |
| 1% Secant |  |  |
| MD, psi (MPa) | 14883 (103) | 16013 (110) |
| TD, psi (MPa) | 16977 (117) | 18557 (128) |
| Elmendorf Tear |  |  |
| MD, g | 142 | 128 |
| TD, g | 378 | 421 |
| MD, g/mil (g/μm) | 171 (6.73) | 156 (6.14) |
| TD, g/mil (g/μm) | 450 (17.7) | 507 (20.0) |
| Dart Drop: g | 220 | 128 |
| g/mil (g/μm) | 262 (10.3) | 154 (6.06) |
| Average Gauge, mil (μm) | 0.84 (21) | 0.83 (21) |
| Haze (%) | 1.5 | 1.5 |
| Gloss 45 degrees | 90.5 | 92.1 |
| Puncture |  |  |
| Peak Force, lb (N) | 9.35 (41.6) | 9.75 (43.4) |
| Peak Force, lb/mil (N/μm) | 11.13 (1.95) | 11.74 (2.06) |
| Break Energy, in · lb (J) | 30.08 (3.40) | 32.43 (3.66) |
| Break Energy, in · lb/mil (mJ/μm) | 35.80 (159) | 39.07 (174) |
| Shrink |  |  |
| MD, % | 42 | 50 |
| TD, % | −3 | −2 |
| Film Density, g/cm³ |  |  |

Comparing Example 14 with the conventional film of Example 15, the films of the present invention show higher dart drop values than films having as an inner layer a conventional ZN-LLDPE/m-LLDPE blend.

All patents, test procedures, and other documents cited herein, including priority documents, are fully incorporated by reference to the extent such disclosure is not inconsistent with this invention and for all jurisdictions in which such incorporation is permitted.

What is claimed is:

1. A polymer blend composition, comprising:
   (i) a copolymer derived from ethylene and one or more $C_3$–$C_{20}$ alpha olefin comonomers, said copolymer having:
   a) a comonomer content of from 5 to 15 wt. %,
   b) a density of less than 0.916 g/cm³,
   c) a composition distribution breadth index in the range of from 55% to 70%,
   d) a molecular weight distribution Mw/Mn of from 2 to 3, e) a molecular weight distribution Mz/Mw of less than 2, and f) a bi-modal composition distribution; and (ii) a linear low density polyethylene polymer having a density of from 0.916 to 0.940 g/cm$^3$.

2. A monolayer film comprising a polymer blend composition, the polymer blend composition comprising:

(i) a copolymer derived from ethylene and one or more $C_3$–$C_{20}$ alpha olefin comonomers, said copolymer having:

a) a comonomer content of from 5 to 15 wt. %, b) a density of less than 0.916 g/cm$^3$, c) a composition distribution breadth index in the range of from 55% to 70%, d) a molecular weight distribution Mw/Mn of from 2 to 3, e) a molecular weight distribution Mz/Mw of less than 2, and f) a bi-modal composition distribution; and (ii) a linear low density polyethylene polymer having a density of from 0.916 to 0.940 g/cm$^3$.

3. A polymer blend composition, comprising:

(i) a copolymer derived from ethylene and one or more $C_3$–$C_{20}$ alpha olefin comonomers, said copolymer having:

a) a comonomer content of from 5 to 15 wt. %, b) a density of less than 0.916 g/cm$^3$, c) a composition distribution breadth index in the range of from 55% to 70%, d) a molecular weight distribution Mw/Mn of from 2 to 3, and e) a molecular weight distribution Mz/Mw of less than 2; and (ii) a linear low density polyethylene polymer having a density of from 0.916 to 0.940 g/cm$^3$.

4. The polymer blend composition, or the monolayer film of claim 1, 2 or 3, wherein the copolymer is produced using an unbridged bis-Cp metallocene catalyst system.

5. The polymer blend composition, or the monolayer film of claim 1, 2 or 3, wherein the copolymer is produced in a gas phase polymerization process.

6. The polymer blend composition, or the monolayer film of claim 1, 2 or 3, wherein the copolymer is produced in a gas phase polymerization process at a pressure in the range of from 100 psig to 1000 psig.

7. The polymer blend composition, or the monolayer film of claim 1, 2 or 3, wherein the copolymer is produced using an unbridged bis-Cp metallocene catalyst system in a gas phase polymerization process at a pressure in the range of from 100 psig to 1000 psig.

8. The polymer blend composition, or the monolayer film of claim 1 or 2 wherein the copolymer has a melt index of 5 g/10 minutes or less.

9. The polymer blend composition claim 3, wherein the copolymer has a melt index of 5 g/10 minutes or more.

10. A polymer blend composition, comprising:

(a) a metallocene-catalyzed linear very low density polyethylene polymer having:

(i) a density of less than 0.916 g/cm$^3$, (ii) a composition distribution breadth index of 50 to 85% by weight, (iii) a molecular weight distribution Mw/Mn of 2 to 3, (iv) a molecular weight distribution Mz/Mw of less than 2, and (v) two peaks in a TREF measurement, and (b) a linear low density polyethylene polymer having a density of from 0.916 to 0.940 g/cm$^3$.

11. A monolayer film formed from a polymer composition blend, the polymer blend composition comprising:

(a) a metallocene-catalyzed linear very low density polyethylene polymer having:

(i) a density of less than 0.916 g/cm$^3$, (ii) a composition distribution breadth index of 50 to 85% by weight, (iii) a molecular weight distribution Mw/Mn of 2 to 3, (iv) a molecular weight distribution Mz/Mw of less than 2, and (v) two peaks in a TREF measurement, and (b) a linear low density polyethylene polymer having a density of from 0.916 to 0.940 g/cm$^3$.

12. A polymer blend composition, comprising:

(a) a metallocene-catalyzed linear very low density polypropylene polymer having:

(i) a density of less than 0.916 g/cm$^3$, (ii) a composition distribution breadth index of 50 to 85% by weight, (iii) a molecular weight distribution Mw/Mn of 2 to 3, and (iv) a molecular weight distribution Mz/Mw of less than 2, and (b) a linear low density polyethylene polymer having a density of from 0.916 to 0.940 g/cm$^3$.

13. The polymer blend composition, or the monolayer film of claim 10, 11 or 12, wherein the very low density polyethylene polymer is a gas-phase metallocene produced very low density polyethylene polymer.

14. The polymer blend composition, or the monolayer film of claim 10, 11 or 12, wherein the very low density polyethylene polymer has a density of from 0.900 to 0.915 g/cm$^3$.

15. The polymer blend composition or the monolayer film of claim 10, 11 or 12, wherein the very low density polyethylene polymer is a comonomer of ethylene and at least one comonomer selected from the group consisting of $C_3$ to $C_{12}$ alpha olefins.

16. The polymer blend composition or the monolayer film of claim 10, 11 or 12, wherein the linear low density polyethylene polymer is a metallocene-catalyzed linear low density polyethylene polymer.

17. The polymer blend composition or the monolayer film of claim 10, 11 or 12, wherein the linear low density polyethylene polymer is a gas-phase metallocene produced linear low density polyethylene polymer.

18. The polymer blend composition or the monolayer film of claim 10, 11 or 12, wherein the linear low density polyethylene polymer is a Ziegler-Natta produced linear low density polyethylene polymer.

19. The polymer blend composition or the monolayer film of claim 10, 11 or 12, wherein the linear low density polyethylene polymer has a melt index of from 0.5 to 20 g/10 min.

20. The polymer blend composition or the monolayer film of claim 10, 11 or 12, wherein the linear low density polyethylene polymer is a comonomer of ethylene and at least one comonomer selected from the group consisting of $C_3$ to $C_{12}$ linear alpha olefins.

21. The polymer blend composition or the monolayer film of claim 10, 11 or 12, wherein the blend comprises 5–80% by weight of the very low density polyethylene polymer and 95–20% by weight of the linear low density polyethylene polymer, based on the total weight of the very low density polyethylene and linear low density polyethylene polymers.

22. The polymer blend composition or the monolayer film of claim 10, 11 or 12, wherein the blend further comprises a second very low density polyethylene polymer having a density of less than 0.916 g/cm$^3$.

23. The polymer blend composition or the monolayer film of claim 10, 11 or 12, wherein the blend further comprises a second linear low density polyethylene polymer having a density of from 0.916 to 0.940 g/cm$^3$.

24. The polymer blend composition or the monolayer film of claim 10 or 11, wherein the very low density polyethylene polymer has a melt index of 5 g/10 min or less.

25. The polymer blend composition claim 12, wherein the very low density polyethylene polymer has a melt index of 5 g/10 min or more.

* * * * *